United States Patent
Tian et al.

(10) Patent No.: US 12,490,093 B2
(45) Date of Patent: Dec. 2, 2025

(54) CONFIGURATION METHOD AND APPARATUS FOR TERMINAL DEVICE, AND COMMUNICATION DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Ye Tian, Beijing (CN); Li Su, Beijing (CN); Shen He, Beijing (CN); Haitao Du, Beijing (CN); Jie Ma, Beijing (CN); Wenshu Jiang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 70 days.

(21) Appl. No.: 18/551,861

(22) PCT Filed: Mar. 22, 2022

(86) PCT No.: PCT/CN2022/082192
§ 371 (c)(1),
(2) Date: Sep. 21, 2023

(87) PCT Pub. No.: WO2022/199569
PCT Pub. Date: Sep. 29, 2022

(65) Prior Publication Data
US 2024/0179523 A1    May 30, 2024

(30) Foreign Application Priority Data

Mar. 22, 2021  (CN) .......................... 202110304444.4
Oct. 19, 2021  (CN) .......................... 202111217636.8

(51) Int. Cl.
*H04L 9/00*  (2022.01)
*H04L 9/30*  (2006.01)
(Continued)

(52) U.S. Cl.
CPC ......... *H04W 12/069* (2021.01); *H04W 12/03* (2021.01); *H04W 12/041* (2021.01); *H04W 12/106* (2021.01); *H04W 12/72* (2021.01)

(58) Field of Classification Search
CPC . H04W 12/069; H04W 12/106; H04W 12/72; H04W 12/03; H04W 12/041
(Continued)

(56) References Cited

U.S. PATENT DOCUMENTS

| | | |
|---|---|---|
| 2015/0095648 A1 | 4/2015 | Nix |
| 2016/0094542 A1 | 3/2016 | Lee |
| 2018/0295125 A1 | 10/2018 | Lee |

FOREIGN PATENT DOCUMENTS

| | | |
|---|---|---|
| CN | 101808286 A | 8/2010 |
| CN | 102202306 A | 9/2011 |

(Continued)

OTHER PUBLICATIONS

John A. MacDonald et al, "Overcoming Channel Bandwidth Constraints in Secure SIM Applications", Security and Privacy in the Age of Ubiquitous Computing, Jun. 2005, pp. 539-549.
(Continued)

*Primary Examiner* — Haresh N Patel
(74) *Attorney, Agent, or Firm* — Syncoda LLC; Feng Ma

(57) ABSTRACT

A configuration method includes: the terminal device generating a second key on the basis of a first key, and performing encryption and/or integrity protection on a certificate request message on the basis of the second key; and sending a first request message, the first request message
(Continued)

comprising the certificate request message encrypted and/or integrity-protected via the second key.

12 Claims, 9 Drawing Sheets

(51) Int. Cl.
*H04W 12/03* (2021.01)
*H04W 12/041* (2021.01)
*H04W 12/069* (2021.01)
*H04W 12/106* (2021.01)
*H04W 12/72* (2021.01)

(58) Field of Classification Search
USPC .......................................................... 713/156
See application file for complete search history.

(56) References Cited

FOREIGN PATENT DOCUMENTS

| CN | 106797564 A | 5/2017 |
|----|----|----|
| CN | 106888449 A | 6/2017 |
| CN | 108667781 A | 10/2018 |
| CN | 110958229 A | 4/2020 |
| CN | 111050322 A | 4/2020 |
| CN | 111404670 A | 7/2020 |
| CN | 112449323 A | 3/2021 |
| JP | 2018093375 A | 6/2018 |
| JP | 2019149714 A | 9/2019 |
| WO | 2009053818 A2 | 4/2009 |
| WO | 2012031433 A1 | 3/2012 |
| WO | 2015144042 A1 | 10/2015 |
| WO | 2017091959 A1 | 6/2017 |
| WO | 2020199134 A1 | 10/2020 |
| WO | 2020249861 A1 | 12/2020 |

OTHER PUBLICATIONS

"3rd Generation Partnership Project; Technical Specification Group Services and System Aspects; Generic Authentication Architecture (GAA); Generic Bootstrapping Architecture (GBA) (Release 18)", 3GPP TS 33.220 V18.3.0 (Mar. 2024), p. 13.

International Search Report in the international application No. PCT/CN2022/082192, mailed on May 26, 2022. 5 pages with English translation.

Written Opinion of the International Search Authority in the international application No. PCT/CN2022/082192, mailed on May 26, 2022. 6 pages with English translation.

"3rd Generation Partnership Project; Technical Specification Group Radio Access Network; NR; NR and NG-RAN Overall Description; Stage 2 (Release 16)", 3GPP Standard; Technical Specification; 3GPP TS 38.300, 3rd Generation Partnership Project (3GPP), Mobile Competence Centre; 650, Route Des Lucioles; F-06921 Sophia-Antipolis Cedex ; FRANCE vol. RAN WG2, No. V16.4.0, Jan. 6, 2021 (Jan. 6, 2021), pp. 1-149, XP051999690, p. 102, lines 8-12, and p. 103, figure 13.1-1.

"3GPP; Technical Specification Group Services and System Aspects; Authentication and Key Management for Applications (AKMA) based on 3GPP credentials in the 5G System (5Gs) (Release 17)", 3GPP Standard; Technical Specification; 3GPP TS 33.535; F-06921 Sophia-Antipolis Cedex; France vol. SA WG3, No. V17.0.0, Dec. 16, 2020 (Dec. 16, 2020), pp. 1-20, XP051999388, p. 12, first paragraph; p. 13, figure 6.1-1; following points 1-3; page14, figure 6.2-1, following point 1.

Supplementary European Search Report in the European application No. 22774225.1, mailed on Jun. 11, 2024, 17 pages.

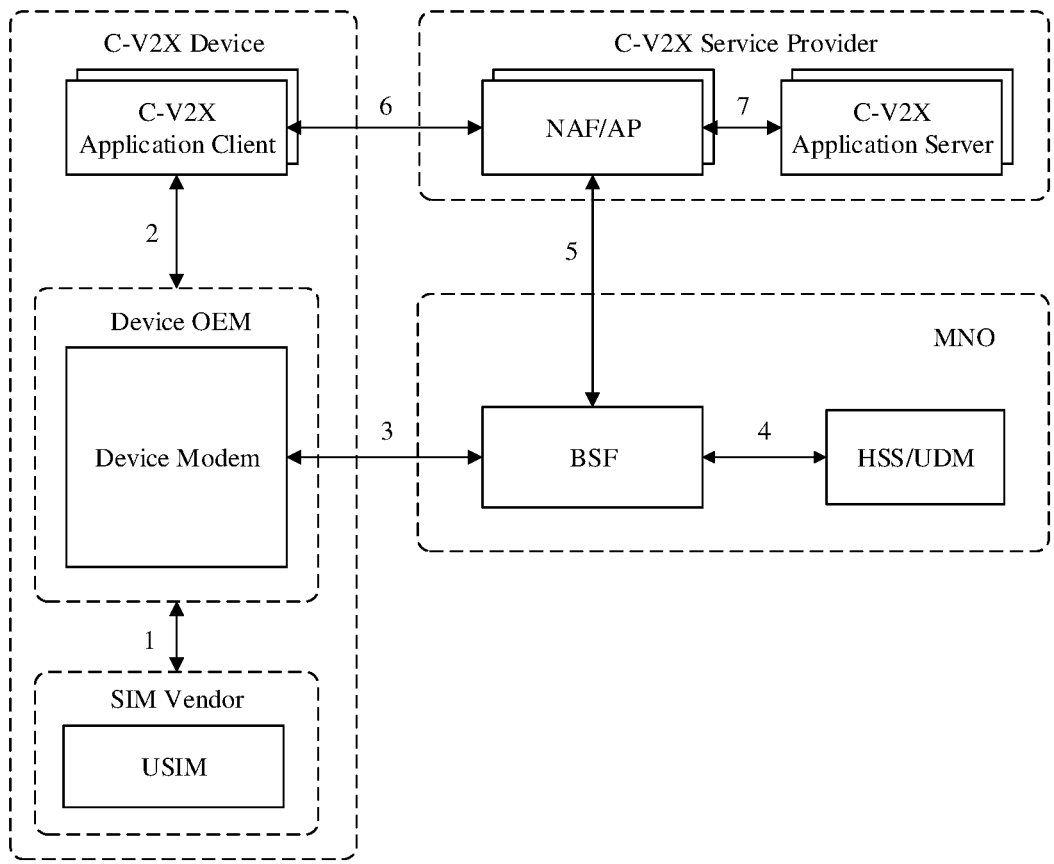

FIG. 1

The terminal device generates at least one second key based on at least one first key, and performs encryption and/or integrity protection on at least one certificate request message based on the at least one second key — 101

The terminal device transmits at least one first request message, the at least one first request message includes the at least one certificate request message encrypted and/or integrity-protected with the at least one second key — 102

FIG. 2

CONFIGURATION METHOD AND APPARATUS FOR TERMINAL DEVICE, AND COMMUNICATION DEVICE

CROSS-REFERENCE TO RELATED APPLICATIONS

This application is a U.S. National Stage of International Application No. PCT/CN2022/082192 filed on Mar. 22, 2022, which claims priority_to Chinese Patent application No. 202110304444.4 filed on Mar. 22, 2021 and Chinese Patent application No. 202111217636.8 filed on Oct. 19, 2021. The disclosures of the above-referenced applications are hereby incorporated by reference in their entirety.

TECHNICAL FIELD

The disclosure relates to the technical field of Internet of Vehicles, and in particular to a method and apparatus for configuring a terminal device, and a communication device.

BACKGROUND

In Internet of Vehicles such as Cellular-Vehicle to X (C-V2X), a large amount of real-time traffic information are transmitted among vehicles, traffic facilities and Internet of Vehicles management systems, and include driving states of the vehicles, road condition events, signal light information, etc. These key traffic information are directly related to security of public transportation and life safety of drivers and passengers, and fundamentally determine whether a C-V2X technology may be industrialized.

In order to ensure information security, at least one digital certificate is introduced, and authenticity of users and devices in a C-V2X system and authenticity of transmitted information are ensured based on the at least one digital certificate. Therefore, ensuring security of the at least one digital certificate becomes the key to industrialize the C-V2X technology.

In a current production process, it needs to configure the at least one digital certificate offline during production of vehicles or Internet of Vehicles devices. Such method raises high safe production requirements for manufacturers of the vehicles and C-V2X terminal devices, the manufacturers need to modify their production lines to meet security requirements for physical environments of offline filling, or the manufacturers need to send their devices to professional security organizations for filling. Therefore, such method has high investment costs and poor flexibility, has difficulty for deployment, and has large difficulty for technical implementation.

Furthermore, when an existing standard Generic Bootstrapping Architecture (GBA) method is used, as shown in FIG. 1, a secure connection may be established between a vehicle or Internet of Vehicles device and a Certificate Authority (CA) server, and a C-V2X device may complete configuration of the at least one digital certificate online. However, the standard solution requires a network operator to deploy a Network Application Function (NAF)/Authentication Proxy (AP) network element for each CA server, to provide a GBA service (referring to a dashed box of C-V2X service provider in FIG. 1, and in the dashed box, the CA server (a C-V2X application server in the figure) corresponds to the NAF/AP network element one-to-one), which increases huge network operation and maintenance costs for the operator. Besides, a GBA session key(s) used by the CA server to communicate with the Internet of Vehicles device is stored in the NAF/AP network element, security protection operations such as encryption, decryption and integrity protection of messages or the like are performed by a NAF/AP device, and NAF/AP is researched and developed according to security technical standards of the communication industry, therefore the CA server cannot flexibly use the GBA session key(s), and the performed security protection operations may not necessarily comply with security technical requirements of a C-V2X Internet of Vehicles industry either, which bring difficulties for industrial applications of the GBA solution.

Furthermore, completing configuration of the at least one digital certificate by way of online configuration has extremely high design requirements for secure implementation of the C-V2X device. In order to ensure securities of the at least one digital certificate and sensitive parameters on the device side, these information cannot simply be operated by client applications, cannot be operated and executed on a general-purpose Central Processing Unit (CPU), internal/external memories or the like of the device. Instead, these information should be processed in a trusted security environment in combination with key generation and acquisition manners. However, an existing configuration solution lacks overall security design and implementation of the device side, and cannot ensure secure configuration of the at least one digital certificate.

In a word, how to safely and conveniently deploy and configure the at least one digital certificate and sensitive security parameters on the C-V2X device is a challenge currently encountered by the C-V2X Internet of Vehicles industry in the security field.

SUMMARY

Embodiments of the disclosure provide a method and apparatus for configuring a terminal device, and a communication device.

Technical solutions of the embodiments of the disclosure are implemented in manners as follows.

According to a first aspect, an embodiment of the disclosure provides a method for configuring a terminal device, the method includes the following operations. The terminal device generates at least one second key based on at least one first key, and performs at least encryption or integrity protection on at least one certificate request message based on the at least one second key. The terminal device transmits at least one first request message, the at least one first request message includes the at least one certificate request message at least encrypted or integrity-protected by the at least one second key.

In some optional embodiments of the disclosure, the method may further include the following operations. The terminal device receives at least one first response message from a server, performs at least integrity verification or decryption on the at least one first response message based on the at least one second key, and obtains at least one digital certificate carried in the at least one first response message.

In some optional embodiments of the disclosure, the terminal device may include an application client, a modem and a Universal Subscriber Identity Module (USIM). The operation of generating, by the terminal device, the at least one second key based on the at least one first key, and performing, by the terminal device, at least encryption or integrity protection on the at least one certificate request message based on the at least one second key may include the following operations. The application client triggers the USIM through the modem, to generate the at least one second key based on the at least one first key. The application client generates at least one first certificate request message, and transmits the at least one first certificate request message to the USIM through the modem. The USIM generates a public/private key pair, adds the public key in the public/private key pair to the at least one first certificate request message, and signs the at least one first certificate request message with the private key in the public/private key pair, to obtain at least one second certificate request message. The USIM performs at least encryption or integrity protection on the at least one second certificate request message based on the at least one second key, and adds a first verification value to the at least one second certificate request message. The USIM transmits the processed at least one second certificate request message to the application client through the modem.

In some optional embodiments of the disclosure, the operation of transmitting the at least one first request message may include the following operations. The application client transmits the at least one first request message to a server, the at least one first request message includes the at least one second certificate request message at least encrypted or integrity-protected by the at least one second key, the at least one first request message further includes at least a Bootstrapping-Transaction Identifier (B-TID) or a Fully Qualified Domain Name (FQDN) of the server.

In some optional embodiments of the disclosure, the terminal device may include an application client, a modem and a USIM. The operation of receiving, by the terminal device, the at least one first response message from the server, and performing, by the terminal device, at least integrity verification or decryption on the at least one first response message based on the at least one second key, and obtaining, by the terminal device, the at least one digital certificate carried in the at least one first response message may include the following operations. The application client receives the at least one first response message from the server, and transmits the at least one first response message to the USIM through the modem. The USIM performs at least integrity verification or decryption on the at least one first response message based on the at least one second key. The USIM obtains the at least one digital certificate carried in the at least one first response message after the verification is passed, and stores the at least one digital certificate in a security component (which is also referred to as a Security Element (SE)).

In some optional embodiments of the disclosure, the method may further include the following operations. The terminal device performs a Generic Bootstrapping Architecture (GBA) authentication process or an Authentication and Key Management for Applications (AKMA) authentication process, and negotiates the at least one first key with a network device.

According to a second aspect, an embodiment of the disclosure further provides a method for configuring a terminal device, the method includes the following operations. A server receives at least one first request message from the terminal device, the at least one first request message includes at least one certificate request message at least encrypted or integrity-protected by at least one second key. The server obtains the at least one second key from a network device, the at least one second key is generated by the network device based on at least one first key. The server performs at least integrity verification or decryption on the at least one first request message based on the at least one second key, and issues at least one digital certificate after authorization of the at least one first request message is passed. The server transmits at least one first response message to the terminal device, the at least one first response message includes the at least one digital certificate.

In some optional embodiments of the disclosure, the operation of transmitting, by the server, the at least one first response message to the terminal device may include the following operations. The server constructs the at least one first response message containing the at least one digital certificate, performs at least encryption or integrity protection on the at least one first response message based on the at least one second key, and adds a second verification value to the at least one first response message. The server transmits the processed at least one first response message to the terminal device.

In some optional embodiments of the disclosure, the at least one first request message may further include a B-TID. The operation of obtaining, by the server, the at least one second key from the network device may include the following operations. The server queries whether there is at least one second key corresponding to the B-TID. The server obtains the at least one second key from the network device, in response to the querying result indicating that there is no second key corresponding to the B-TID.

In some optional embodiments of the disclosure, the operation of obtaining, by the server, the at least one second key from the network device may include the following operations. The server transmits at least one second request message to the network device, the at least one second request message is configured to request the at least one second key. The server receives at least one second response message transmitted by the network device, the at least one second response message includes the at least one second key.

According to a third aspect, an embodiment of the disclosure further provides a method for configuring a terminal device, the method includes the following operations. A network device generates at least one second key based on at least one at least one pre-negotiated first key, and transmits the at least one second key to a server.

In some optional embodiments of the disclosure, the method may further include the following operations. The network device negotiates the at least one first key with the terminal device through performing a GBA authentication process or an AKMA authentication process with the terminal device.

In some optional embodiments of the disclosure, the operation of generating, by the network device, the at least one second key based on the at least one pre-negotiated first key, and transmitting, by the network device, the at least one second key to the server may include the following operations. The network device receives at least one second request message transmitted by the server, the at least one second request message is configured to request the at least one second key. The network device generates the at least one second key based on the at least one pre-negotiated first key, and transmits at least one second response message to the server, the at least one second response message includes the at least one second key.

According to a fourth aspect, an embodiment of the disclosure further provides an apparatus for configuring a terminal device, the apparatus includes a first generation unit and a first communication unit. The first generation unit is configured to generate at least one second key based on at least one first key, and perform at least encryption or integrity protection on at least one certificate request message based on the at least one second key. The first communication unit is configured to transmit at least one first request message which includes the at least one certificate request message at least encrypted or integrity-protected by the at least one second key.

In some optional embodiments of the disclosure, the first communication unit may be further configured to receive at least one first response message from a server, perform at least integrity verification or decryption on the at least one first response message based on the at least one second key, and obtain at least one digital certificate carried in the at least one first response message.

In some optional embodiments of the disclosure, the first generation unit may include an application client, a modem and a USIM. The application client is configured to trigger the USIM through the modem, to generate the at least one second key based on the at least one first key, and is further configured to generate at least one first certificate request message, and transmit the at least one first certificate request message to the USIM through the modem. The USIM is configured to: generate a public/private key pair, add the public key in the public/private key pair to the at least one first certificate request message, and sign the at least one first certificate request message with the private key in the public/private key pair, to obtain at least one second certificate request message; perform at least encryption or integrity protection on the at least one second certificate request message based on the at least one second key, and add a first verification value to the at least one second certificate request message; and transmit the at least one second certificate request message at least encrypted or integrity-protected by the at least one second key to the application client through the modem.

In some optional embodiments of the disclosure, the application client may be configured to transmit the at least one first request message to a server through the first communication unit, the at least one first request message includes the at least one second certificate request message at least encrypted or integrity-protected by the at least one second key, and the at least one first request message further includes at least a B-TID or a FQDN of the server.

In some optional embodiments of the disclosure, the first generation unit may include an application client, a modem and a USIM. The application client is configured to receive the at least one first response message from the server through the first communication unit, and transmit the at least one first response message to the USIM through the modem. The USIM is configured to: perform at least integrity verification or decryption on the at least one first response message based on the at least one second key; and obtain the at least one digital certificate carried in the at least one first response message after the verification is passed, and store the at least one digital certificate in a security component.

In some optional embodiments of the disclosure, the apparatus may further include a first execution unit. The first execution unit is configured to perform a GBA authentication process or an AKMA authentication process, and negotiate the at least one first key with a network device.

According to a fifth aspect, an embodiment of the disclosure further provides an apparatus for configuring a terminal device, the apparatus includes a second communication unit and a first verification unit. The second communication unit is configured to receive at least one first request message from the terminal device, the at least one first request message includes at least one certificate request message at least encrypted or integrity-protected by at least one second key. The first verification unit is configured to obtain the at least one second key from a network device, the at least one second key is generated by the network device based on at least one first key; and is further configured to perform at least integrity verification or decryption on the at least one first request message based on the at least one second key, and issue at least one digital certificate after authorization of the at least one first request message is passed. The second communication unit is further configured to transmit at least one first response message to the terminal device, the at least one first response message includes the at least one digital certificate.

In some optional embodiments of the disclosure, the second communication unit may be configured to construct the at least one first response message containing the at least one digital certificate, perform at least encryption or integrity protection on the at least one first response message based on the at least one second key, add a second verification value to the at least one first response message, and transmit the processed at least one first response message to the terminal device.

In some optional embodiments of the disclosure, the at least one first request message may further include a B-TID. The apparatus may further include a second execution unit. The second execution unit is configured to query whether there is at least one second key corresponding to the B-TID, and obtain the at least one second key from the network device through the second communication unit, in response to the querying result indicating that there is no second key corresponding to the B-TID.

According to a sixth aspect, an embodiment of the disclosure further provides an apparatus for configuring a terminal device, the apparatus includes a second generation unit and a third communication unit. The second generation unit is configured to generate at least one second key based on at least one at least one pre-negotiated first key. The third communication unit is configured to transmit the at least one second key to a server.

In some optional embodiments of the disclosure, the apparatus may further include a third execution unit. The third execution unit is configured to negotiate the at least one first key with the terminal device through performing a GBA authentication process or an AKMA authentication process with the terminal device.

In some optional embodiments of the disclosure, the second generation unit may be configured to, for each server, generate at least one corresponding second key based on the at least one pre-negotiated first key, and the third communication unit is configured to transmit, to each server, the corresponding second key.

According to a seventh aspect, an embodiment of the disclosure further provides a method for configuring a terminal device, the method includes the following operations. The terminal device generates at least one second key based on at least one first key, and performs at least encryption or integrity protection on part or entirety of at least one first message based on the at least one second key. The terminal device transmits the at least one first message.

In some optional embodiments of the disclosure, the method may further include the following operations. The terminal device receives at least one second message from a server, and performs at least integrity verification or decryption on the at least one second message based on the at least one second key.

In some optional embodiments of the disclosure, the terminal device may include an application client, a modem and a USIM. The operation of generating, by the terminal device, the at least one second key based on the at least one first key, and performing, by the terminal device, at least encryption or integrity protection on part or entirety of the at least one first message based on the at least one second key may include the following operations. The application client triggers the USIM through the modem, to generate the at least one second key based on the at least one first key. The application client generates the at least one first message, and transmits the at least one first message to the USIM through the modem. The USIM performs at least encryption or integrity protection on part or entirety of the at least one first message based on the at least one second key. The USIM transmits the processed at least one first message to the application client through the modem.

In some optional embodiments of the disclosure, the operation of transmitting the at least one first message may include the following operations. The application client transmits the at least one first message to a server. The at least one first message further includes at least a B-TID or a FQDN of the server, or includes at least an AKMA key identifier (A-KID) or the FQDN.

In some optional embodiments of the disclosure, the terminal device may include an application client, a modem and a USIM. The operation of receiving, by the terminal device, the at least one second message from the server, and performing, by the terminal device, at least integrity verification or decryption on the at least one second message based on the at least one second key may include the following operations. The application client receives the at least one second message from the server, and transmits the at least one second message to the USIM through the modem. The USIM performs at least integrity verification or decryption on the at least one second message based on the at least one second key.

According to an eighth aspect, an embodiment of the disclosure further provides a method for configuring a terminal device, the method includes the following operations. A server receives at least one first message from the terminal device, part or entirety of the at least one first message is at least encrypted or integrity-protected by at least one second key. The server obtains the at least one second key from a network device, the at least one second key is generated by the network device based on at least one first key. The server performs at least integrity verification or decryption on the at least one first message based on the at least one second key.

In some optional embodiments of the disclosure, the method may further include the following operations. The server performs at least encryption or integrity protection on part or entirety of at least one second message based on the at least one second key. The server transmits the at least one second message.

In some optional embodiments of the disclosure, the at least one first message may further include a B-TID or an A-KID.

The operation of obtaining, by the server, the at least one second key from the network device may include the following operations. The server queries whether there is at least one second key corresponding to the B-TID or the A-KID. The server obtains the at least one second key from the network device, in response to the querying result indicating that there is no second key corresponding to the B-TID or the A-KID.

According to a ninth aspect, an embodiment of the disclosure further provides an apparatus for configuring a terminal device, the apparatus includes a third generation unit and a fourth communication unit. The third generation unit is configured to generate at least one second key based on at least one first key, and perform at least encryption or integrity protection on part or entirety of at least one first message based on the at least one second key. The fourth communication unit is configured to transmit the at least one first message.

In some optional embodiments of the disclosure, the fourth communication unit may be further configured to receive at least one second message from a server, and perform at least integrity verification or decryption on the at least one second message based on the at least one second key.

In some optional embodiments of the disclosure, the third generation unit may include an application client, a modem and a USIM.

The application client is configured to trigger the USIM through the modem, to generate the at least one second key based on the at least one first key, and is further configured to generate the at least one first message, and transmit the at least one first message to the USIM through the modem.

The USIM is configured to perform at least encryption or integrity protection on part or entirety of the at least one first message based on the at least one second key, and is further configured to transmit the processed at least one first message to the application client through the modem.

In some optional embodiments of the disclosure, the application client may be further configured to transmit the at least one first message to a server. The at least one first message further includes at least a B-TID or a FQDN of the server, or includes at least an A-KID or the FQDN.

In some optional embodiments of the disclosure, the third generation unit may include an application client, a modem and a USIM. The application client is configured to receive the at least one second message from the server, and transmit the at least one second message to the USIM through the modem. The USIM is configured to perform at least integrity verification or decryption on the at least one second message based on the at least one second key.

According to a tenth aspect, an embodiment of the disclosure further provides an apparatus for configuring a terminal device, the apparatus includes a fifth communication unit and a second verification unit. The fifth communication unit is configured to receive at least one first message from the terminal device, part or entirety of the at least one first message is at least encrypted or integrity-protected by at least one second key. The second verification unit is configured to obtain the at least one second key from a network device, the at least one second key is generated by the network device based on at least one first key, and the second verification unit is further configured to perform at least integrity verification or decryption on the at least one first message based on the at least one second key.

In some optional embodiments of the disclosure, the apparatus may further include a fourth generation unit. The fourth generation unit is configured to perform at least encryption or integrity protection on part or entirety of at least one second message based on the at least one second key. The fifth communication unit is further configured to transmit the at least one second message.

In some optional embodiments of the disclosure, the at least one first message may further include a B-TID or an A-KID. The apparatus may further include a fourth execution unit. The fourth execution unit is configured to query whether there is at least one second key corresponding to the B-TID or the A-KID. The second verification unit is configured to obtain the at least one second key from the network device through the fifth communication unit, in response to the querying result obtained by the fourth execution unit indicating that there is no second key corresponding to the B-TID or the A-KID.

According to an eleventh aspect, an embodiment of the disclosure further provides a computer-readable storage medium, having stored thereon a computer program, the program implements operations of the method described in the first aspect, the second aspect, the third aspect, the seventh aspect or the eighth aspect of the embodiments of the disclosure when the program is executed by a processor.

According to a twelfth aspect, an embodiment of the disclosure further provides a communication device, including a memory, a processor, and a computer program stored on the memory and executable on the processor, the processor implements operations of the method described in the first aspect, the second aspect, the third aspect, the seventh aspect or the eighth aspect of the embodiments of the disclosure when the processor executes the program.

According to the method and apparatus for configuring a terminal device, and the communication device provided in the embodiments of the disclosure, the terminal device generates at least one second key based on at least one first key, and performs encryption and/or integrity protection on at least one certificate request message based on the at least one second key, and transmits at least one request message, the at least one request message includes the at least one certificate request message encrypted and/or integrity-protected by the at least one second key; a server receives the at least one request message from the terminal device, the at least one request message includes the at least one certificate request message encrypted and/or integrity-protected by the at least one second key; the server obtains the at least one second key from a network device, the at least one second key is generated by the network device based on at least one first key; the server performs at least integrity verification or decryption on the at least one request message based on the at least one second key, and issues at least one digital certificate after authorization of the at least one request message is passed; the server transmits a response message to the terminal device, the at least one response message includes the at least one digital certificate. By the technical solutions of the embodiments of the disclosure, secure configuration of the at least one digital certificate of the C-V2X terminal device may be achieved in a "one-click configuration" manner based on a GBA mechanism, without modifying security environments of production lines and without filling by professional security organizations, which improves configuration flexibility of the at least one digital certificate, and reduces deployment difficulty and investment costs.

BRIEF DESCRIPTION OF THE DRAWINGS

FIG. 1 is a schematic diagram of a GBA architecture.

FIG. 2 is a first schematic flowchart of a method for configuring a terminal device according to an embodiment of the disclosure.

DETAILED DESCRIPTION

Figure 3:
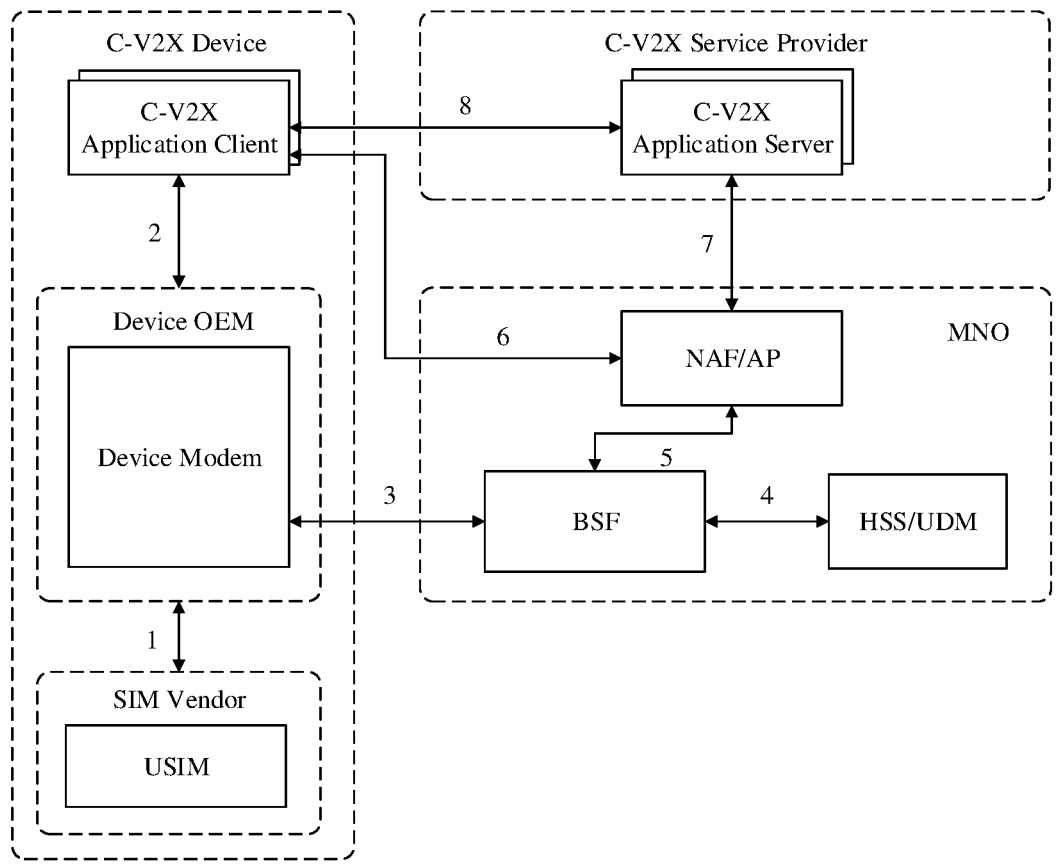
FIG. 3 is a schematic diagram of a GBA enhanced architecture according to an embodiment of the disclosure.

The disclosure will be further described in detail below in combination with the drawings and specific embodiments.

An embodiment of the disclosure provides a method for configuring a terminal device. FIG. 2 is a first schematic flowchart of a method for configuring a terminal device according to an embodiment of the disclosure. As shown in FIG. 2, the method includes the following operations 101 and 102.

At 101, the terminal device generates at least one second key based on at least one first key, and performs encryption and/or integrity protection on at least one certificate request message based on the at least one second key.

At 102, the terminal device transmits at least one first request message. The at least one first request message includes the at least one certificate request message encrypted and/or integrity-protected by the at least one second key.

The method for configuring a terminal device (hereinafter, abbreviated as the method) of the embodiment is applied to the terminal device, and the terminal device may specifically be an Internet of Vehicles terminal device (it may also be referred to as a Cellular-Vehicle to X (C-V2X) device). In some optional embodiments, for example, the Internet of Vehicles terminal device may be an On Board Unit (OBU), a Road Side Unit (RSU), etc.; in some other optional embodiments, the Internet of Vehicles terminal device may also be a pedestrian's hand-held device, wearable device, etc.

In some optional embodiments of the disclosure, the method further includes the following operations. The terminal device performs a Generic Bootstrapping Architecture (GBA) authentication process or an Authentication and Key Management for Applications (AKMA) authentication process, and negotiates the at least one first key with a network device.

Specifically, the network device here may specifically be a Network Application Function (NAF) or an Authentication Proxy (AP), in case of the GBA authentication process. Further, in case of the AKMA authentication process, the network device may be a Network Exposure Function (NEF) configured to expose network capabilities to be used by other network elements.

A possible implementation of the terminal pre-negotiating the at least one first key with the network device is as follows (here, the C-V2X device being based on the GBA authentication process is taken as an example).

The C-V2X device performs Authentication and Key Agreement (AKA) authentication with a Bootstrapping Server Function (BSF), and after the BSF returns a 200 OK response, the C-V2X device generates a GBA session key (s), i.e., the at least one first key. Subsequently, when the C-V2X device accesses the NAF/AP, the NAF/AP requests the BSF to generate the same GBA session key(s), i.e., the at least one first key, by negotiating with them. The NAF/AP here provides GBA services to a C-V2X service provider (such as a C-V2X application server). The NAF/AP obtains the GBA session key(s), i.e., the at least one first key from the BSF, thereby completing the process of the terminal negotiating the at least one first key with the network device.

When the C-V2X device needs to securely interact service messages with the server (for example, applying for at least one digital certificate), the C-V2X device initiates an application request to the server. At this point, the server accesses the NAF/AP through a secure connection pre-established with the network device, requests the NAF/AP to generate the at least one second key for this service based on the at least one first key, and obtains the generated second key. The C-V2X terminal and the server may perform security processing such as encryption, integrity protection or the like on the interacted service messages based on the at least one second key, which is equivalent to establishing a secure communication channel between the C-V2X terminal and the server.

The server here may be a C-V2X application server, and the C-V2X application server may be a Certificate Authority (CA) server (that is, a certificate authority). In this architecture, the CA server may be an Enrollment CA (ECA) server or an Authorization CA (ACA) server. That is, when the C-V2X device needs to apply for an enrollment certificate, the server is the ECA server (or ECA) correspondingly; when the C-V2X needs to apply for an authorization certificate or an application certificate or an identity certificate, the server is the ACA server (or ACA) correspondingly. The CA server may be deployed by a Mobile Network Operator (MNO) itself or by a third party, to provide certificate services for the C-V2X device.

Establishment of the secure communication channel between the C-V2X terminal and the server here means that after passing the above GBA authentication process, the terminal device may obtain the at least one first key, and then generate the at least one second key based on the at least one first key. The server side may obtain the at least one second key from the network device (the network device NAF/AP has negotiated the at least one first key with the terminal in advance, generates the at least one second key based on the at least one first key when the server needs the at least one second key, and returns the at least one second key to the server, this process will be described in detail later). It may be seen that both the terminal device and the server obtain the at least one second key, and perform security protection and transmission and reception of messages based on the at least one second key, so that a secure channel (or referred to as a secure connection, a secure link, etc.) is actually established between the terminal device and the server) which is used to protect transmitted and received messages well based on the at least one second key.

Furthermore, the at least one first key here may also be referred to as a shared session key(s), the at least one second key is generated based on the at least one first key, and the at least one second key may also be referred to as an application session key(s) or a session key(s).

It should be noted that the terminal device to which the method is applied may be deployed in a GBA enhanced architecture as shown in FIG. 3. In the enhanced architecture, the network device NAF/AP is shared by a few C-V2X application servers (such as CA servers) (referring to a dashed box of C-V2X service provider in FIG. 3, a NAF/AP network element is not included in the dashed box, instead, the NAF/AP network element is deployed on the MNO side, and multiple CA servers (C-V2X application server in the figure) share one NAF/AP network element). It is not difficult to understand that multiple CA servers sharing one NAF/AP network element may greatly reduce deployment costs and reduce maintenance difficulties.

Further, based on the GBA session key(s) (such as Ks_int_NAF) provided by the BSF in a GBA-bootstrapped security association process, the network device NAF/AP further derives a GBA application session key(s) (indicated by K*) for each C-V2X application server (such as CA server), and shares K* with the CA server. Furthermore, the C-V2X device also obtains the same K* as in the GBA-bootstrapped process locally, and then provides K* to be called by an upper-layer C-V2X Application Client. In this way, the CA server and the C-V2X device share the same GBA application session key(s) K*. The CA server and the C-V2X device may use K* to achieve mutual authentication, protect transmitted messages, establish a secure channel, etc., and then protect C-V2X certificate application and issuance processes using the shared GBA application session key(s) K*.

The method of the embodiment may allow a user to implement configuration of the at least one digital certificate through a "one-click" triggering manner. Specifically, the user may easily trigger the terminal to start configuration operations of the certificate by triggering through clicking on a human-machine interface on the terminal or through other interface software. After receiving a triggering command, the terminal may automatically complete operations such as access authentication, secure channel establishment, key generation, digital certificate application, subsequent digital certificate download and secure storage or the like with the server, to implement initial secure configuration of the terminal device. Compared to existing offline deployment and online deployment manners, the above manner has a high degree of automation, low application and maintenance costs, few manual operation steps, and is easy to be spread.

In some optional embodiments of the disclosure, the terminal device includes an application client (it may also be referred to as a C-V2X application client), a modem (it may also be referred to as a device modem, and used to access a $4^{th}$ generation (4G) or $5^{th}$ generation (5G) network), and a Universal Subscriber Identity Module (USIM). The operation of generating, by the terminal device, the at least one second key based on the at least one first key, and performing, by the terminal device, encryption and/or integrity protection on the at least one certificate request message based on the at least one second key includes the following operations. The application client triggers the USIM through the modem, to generate the at least one second key based on the at least one first key. The application client generates at least one first certificate request message, and transmits the at least one first certificate request message to the USIM through the modem. The USIM generates a public/private key pair (i.e., a pair of public and private keys), adds the public key in the public/private key pair to the at least one first certificate request message, and signs the at least one first certificate request message with the private key in the public/private key pair, to obtain at least one second certificate request message. The USIM performs encryption and/or integrity protection on the at least one second certificate request message based on the at least one second key, and adds a first verification value to the at least one second certificate request message. The USIM transmits the processed at least one second certificate request message to the application client through the modem.

The at least one second key here may be composed of only one key, or may be composed of multiple keys (that is, multiple keys here are all generated based on the at least one first key, and are collectively referred to as the at least one second key). In a feasible implementation, the at least one second key is composed of multiple keys, for example, the at least one second key may include an encryption key(s) and/or an integrity protection key(s); of course, the at least one second key may also include other types of keys according to actual requirements, which is not elaborated here. Further, the process of the USIM performing encryption on the at least one second certificate request message based on the at least one second key includes the following operations. The USIM encrypts the at least one second certificate request message in form of plaintext with an encryption key(s) in the at least one second key, so that the at least one second certificate request message in form of plaintext becomes ciphertext. And/or, the process of the USIM performing integrity protection on the at least one second certificate request message based on the at least one second key includes the following operations. The USIM performs integrity protection on the at least one message with an integrity protection key(s) in the at least one second key, for example, the USIM may calculate a first verification value for the encrypted message with the integrity protection key(s), and then adds the calculated first verification value to the at least one second certificate request message. Optionally, the first verification value may be a Hash-based Message Authentication Code (HMAC) value. Exemplarily, the USIM may perform calculation based on certain bits in the at least one message, to obtain the first verification value. It should be noted that "adds the calculated first verification value to the at least one request message" is actually an operation in the process of integrity protection of the at least one message. Here, in order to make a clearer explain on how to protect the at least one second certificate request message subsequently, this operation is emphasized.

Figure 4:
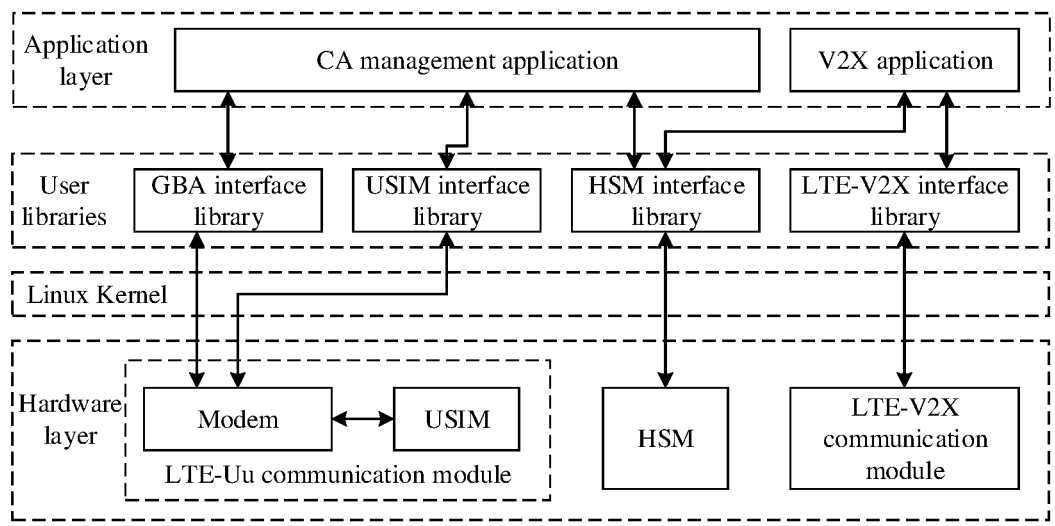
FIG. 4 is a schematic diagram of an optional architecture of a terminal device according to an embodiment of the disclosure.

FIG. 4 is a schematic diagram of an optional architecture of a terminal device according to an embodiment of the disclosure. As shown in FIG. 4, the terminal device may include an application layer, user libraries, Linux Kernel, hardware layer, etc. The application layer may include a CA management application and a V2X application; the user libraries include a GBA interface library, a USIM interface library, a Hardware Security Module (HSM) interface library, a Long Term Evolution (LTE)-V2X interface library, etc.; the hardware layer includes a HSM, a LTE-V2X communication module and a LTE-Uu communication module, the LTE-Uu communication module may include a modem and a USIM. The LTE-Uu communication module, the LTE-V2X communication module and the HSM are implemented as discrete modules or components, or may be packaged and integrated into one module/modular assembly, however, this does not affect logical function division among them.

In the example, the CA management application (i.e., a CA application client) is a control software for the terminal device (such as a C-V2X terminal devices) to implement "initial secure one-click configuration", and is responsible for logic control of the entire service process. The V2X application (it may also be referred to as a C-V2X application) is a service application module for the terminal device to implement V2X direct-connection communication through a PC5/V5 interface, and is responsible for controlling transmission and reception of direct-connection communication service messages. The V2X application implements C-V2X service interaction with other terminal devices by calling the LTE-V2X interface library to access the LTE-V2X communication module at the hardware layer.

The GBA interface library, the USIM interface library and the HSM interface library are invoke application programming interfaces (APIs) opened by underlying hardware modules of the terminal to upper-layer applications, and are used to call a GBA secure access authentication capability supported by the LTE-Uu communication module, at least one digital certificate management application capability and security capability provided by the USIM, as well as secure storage and operation capabilities provided by the HSM, respectively.

Of course, the compositional architecture of the terminal device in the embodiment of the disclosure is not limited to that shown in FIG. 4, and other architectural forms may also fall within the scope of protection of the embodiment of the disclosure.

The application client in the embodiment is responsible for implementing functions of the CA management application and managing the at least one digital certificate of the terminal device, which may refer to the CA management application in FIG. 4 for the details.

In the embodiment, the application client triggers the USIM through the modem and by calling the USIM interface library, to generate the at least one second key based on the at least one first key. The application client may generate the at least one first certificate request message according to "one-click trigger", call a USIM reconstruction certificate request interface (i.e., the first USIM interface), and transmit the at least one first certificate request message to the USIM through the modem. Of course, the first USIM interface in the embodiment is not limited to the USIM reconstruction certificate request interface, and other interface names used for reconstructing certificate requests may also fall within the scope of protection of the embodiment of the disclosure. After receiving the at least one first certificate request message, the USIM may generate a public/private key pair based on a random number generator inside a Universal Integrated Circuit Card (UICC), improve the at least one certificate request message according to requirements of protocol formats of C-V2X related specifications, add the public key in the public/private key pair to the at least one first certificate request message, and sign the at least one first certificate request message with the private key in the public/private key pair, to obtain the at least one second certificate request message, and the USIM performs encryption and/or integrity protection on the at least one second certificate request message based on the at least one second key. Next, the USIM transmits the processed at least one second certificate request message to the application client through the modem and the interface library.

The UICC here is a security hardware with a security level reaching Evaluation Assurance Level (EAL) 4+, the USIM function may be implemented based on the UICC, and the UICC may ensure security of Ks_int_NAF (i.e., the at least one first key). Specifically, the UICC may be understood as a general architecture, or may be understood as a security carrier. When the USIM function is implemented in the general architecture, the USIM function is implemented, that is, the general architecture becomes the USIM. In fact, the UICC may also implement many applications, that is, the architecture may support implementation of many functions. In the embodiment of the disclosure, the USIM is implemented, thus the USIM also has high security, and then operations such as generation of the public/private key pair of the certificate, cryptographic operations, secure storage and other operations may be performed in the USIM, which may effectively ensure security of the terminal. Hidden dangers in the related art, such as leakage of sensitive information caused by operating and storing keys in Central Processing Unit (CPU), memory and other devices of an insecure terminal, are avoided. Furthermore, it may avoid adding new security hardware to the terminal with an existing USIM used as a security device on the terminal to perform the above security operations, thereby reducing hardware implementation cost of the terminal.

Exemplarily, the at least one digital certificate in the embodiment may also be referred to as an Enrollment Certificate (EC), and is used to identify a trusted terminal device, thus it needs to implement initial secure configuration of the at least one digital certificate on the terminal device in a secure manner. Correspondingly, the server in the embodiment may be an ECA server, i.e., an authorization CA server.

In some optional embodiments of the disclosure, the operation of transmitting the at least one first request message includes the following operations. The application client transmits the at least one first request message to a server, the at least one first request message includes the at least one second certificate request message encrypted and/or integrity-protected by the at least one second key, the at least one first request message further includes at least a Bootstrapping-Transaction Identifier (B-TID) or a Fully Qualified Domain Name (FQDN) of the server.

In some optional embodiments of the disclosure, the method further includes the following operations. The terminal device receives at least one first response message from a server, performs at least integrity verification or decryption on the at least one first response message based on the at least one second key, and obtains at least one digital certificate carried in the at least one first response message.

In the embodiment, exemplarily, the at least one first response message may be carried by a HyperText Transfer Protocol (HTTP) message, for example, the at least one first response message may be carried by a HTTP 200 OK message.

In some optional embodiments of the disclosure, the terminal device includes an application client, a modem and a USIM. The operation of receiving, by the terminal device, the at least one first response message from the server, and performing, by the terminal device, at least integrity verification or decryption on the at least one first response message based on the at least one second key, and obtaining, by the terminal device, the at least one digital certificate carried in the at least one first response message includes the following operations. The application client receives the at least one first response message from the server, and transmits the at least one first response message to the USIM through the modem. The USIM performs at least integrity verification or decryption on the at least one first response message based on the at least one second key. The USIM obtains the at least one digital certificate carried in the at least one first response message after the verification is passed, and stores the at least one digital certificate in a security component.

In the embodiment, the application client receives the at least one first response message from the CA server, calls a USIM security inspection interface (i.e., a second USIM interface) and transmits the at least one first response message to the USIM through the modem; of course, in the embodiment, the second USIM interface is not limited to the USIM security inspection interface, and other interfaces for security inspection may also fall within the scope of protection of the embodiment of the disclosure. The USIM performs at least integrity verification or decryption on the at least one first response message based on the at least one second key, a second verification value is carried in the at least one first response message, and the integrity verification refers to verifying the second verification value carried in the at least one first response message. Optionally, the second verification value may also be a HMAC value. Exemplarily, the USIM may perform calculation based on certain bits in the at least one message, to obtain a verification value, and then compare the verification value to the second verification value, and when the comparison result indicates they are the same, it means that the integrity verification is passed. After the verification is passed, the USIM obtains the at least one digital certificate carried in the at least one first response message.

In the embodiment, the USIM stores the at least one digital certificate in the security component. Exemplarily, the USIM (it may also include the HSM) is a local security entity/module of the terminal device, and may provide a reliable security environment for data operation, storage and processing. In order to ensure security of V2X service data, keys (for example, sensitive parameters such as the at least one first key, the public/private key pair, etc.), the at least one digital certificate or the like as well as operations related thereto are usually processed in the local security entity/module of the terminal device, thereby ensuring security of a secure configuration process of the at least one digital certificate of the C-V2X terminal device.

Figure 5:
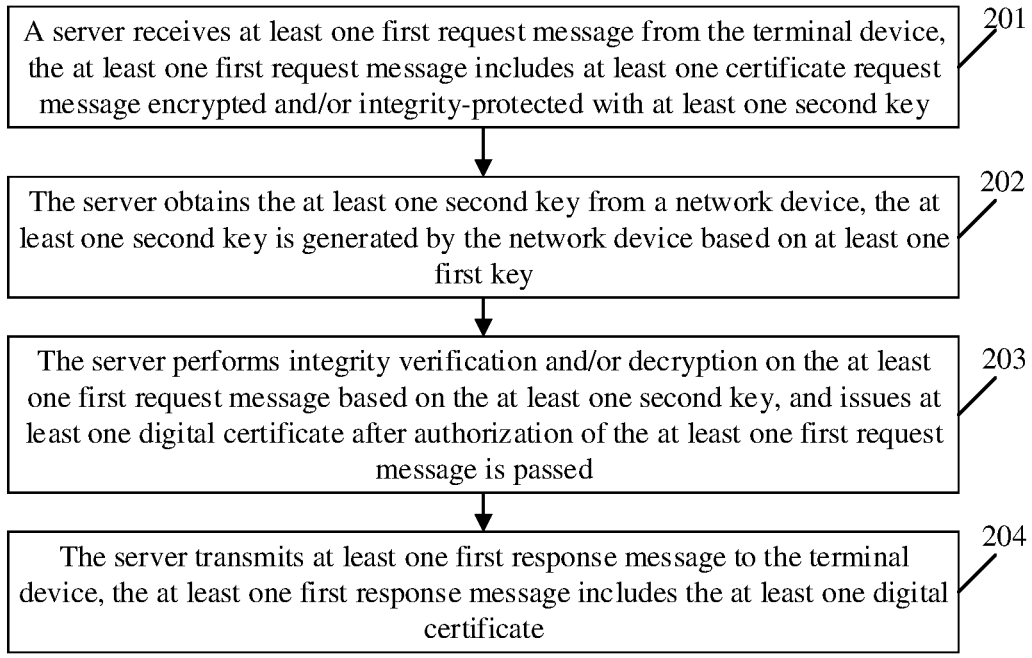
FIG. 5 is a second schematic flowchart of a method for configuring a terminal device according to an embodiment of the disclosure.

Based on the foregoing embodiments, an embodiment of the disclosure further provides a method for configuring a terminal device. FIG. 5 is a second schematic flowchart of a method for configuring a terminal device according to an embodiment of the disclosure. As shown in FIG. 5, the method includes the following operations 201 to 204.

At 201, a server receives at least one first request message from the terminal device, the at least one first request message includes at least one certificate request message encrypted and/or integrity-protected by at least one second key.

At 202, the server obtains the at least one second key from a network device, the at least one second key is generated by the network device based on at least one first key.

At 203, the server performs at least integrity verification or decryption on the at least one first request message based on the at least one second key, and issues at least one digital certificate after authorization of the at least one first request message is passed.

At 204, the server transmits at least one first response message to the terminal device, the at least one first response message includes the at least one digital certificate.

In the embodiment, with the user's "one-click" trigger, the terminal device may automatically complete operations such as server access authentication, secure channel establishment, key generation, digital certificate application, subsequent digital certificate download and secure storage or the like based on a GBA technical mechanism or an AKMA authentication mechanism, to implement initial secure configuration of the terminal device.

In the embodiment, the server receives the at least one first request message from the terminal device through the established secure channel. Exemplarily, the server may receive the at least one first request message from the terminal device through the network device, that is, the at least one first request message is sent from the terminal device and arrives at the network device, and then the at least one first request message is transmitted to the server through the network device.

In the embodiment, since the at least one first request message includes the at least one certificate request message encrypted and/or integrity-protected by the at least one second key, the server needs to obtain the at least one second key. Exemplarily, the server obtains the at least one second key from the network device. In a process of the terminal device performing the GBA authentication process or the AKMA authentication process, the terminal device negotiates the at least one first key with the network device, and the at least one first key may also be referred to as a shared session key.

In some optional implementations, the operation of obtaining, by the server, the at least one second key from the network device includes the following operations. The server transmits at least one second request message to the network device, the at least one second request message is configured to request the at least one second key. The server receives at least one second response message transmitted by the network device, the at least one second response message includes the at least one second key.

In the embodiment, the server may transmit the at least one second request message to the network device, the at least one second request message is configured to request the at least one second key; after receiving the at least one second request message, the network device generates the at least one second key based on the at least one pre-negotiated first key, and then transmits the at least one second response message to the server, the at least one second response message includes the at least one second key, thereby allowing the server to obtain the at least one second key.

In some other optional implementations, after receiving the at least one first request message transmitted by the terminal device to request the at least one digital certificate, the network device may also generate the at least one second key based on the at least one pre-negotiated first key, and transmit the at least one second key to the server in a process of transmitting the at least one first request message to the server.

In some optional embodiments of the disclosure, the at least one first request message further includes a B-TID. The operation of obtaining, by the server, the at least one second key from the network device includes the following operations. The server queries whether there is at least one second key corresponding to the B-TID. The server obtains the at least one second key from the network device, in response to the querying result indicating that there is no second key corresponding to the B-TID.

In the embodiment, the server may obtain the at least one second key corresponding to the B-TID in advance. After receiving the at least one first request message, whether there is at least one second key corresponding to the B-TID may be queried first through the B-TID carried in the at least one first request message. In a case that the querying result indicates that there is no second key corresponding to the B-TID, the server may obtain the at least one second key from the network device. In a case that there is at least one second key corresponding to the B-TID, the server may directly obtain the at least one second key corresponding to the B-TID.

In the embodiment, since the at least one message transmitted by the terminal device is encrypted and/or integrity-protected by the at least one second key, after the server obtains the at least one second key, the server performs at least integrity verification or decryption on the at least one first request message based on the at least one second key, and issues the at least one digital certificate after authorization of the at least one first request message is passed.

In the embodiment, the at least one certificate request message further includes a first verification value, the first verification value may be a HMAC value, and the server may perform calculation based on certain bits in the at least one first request message, to obtain a verification value, and then compare the verification value with the first verification value, and when the comparison result indicates they are the same, it means that the integrity verification is passed.

In some optional embodiments of the disclosure, the operation of transmitting, by the server, the at least one first response message to the terminal device includes the following operations. The server constructs the at least one first response message containing the at least one digital certificate, performs encryption and/or integrity protection on the at least one first response message based on the at least one second key, and adds a second verification value to the at least one first response message. The server transmits the processed at least one first response message to the terminal device. Similarly, addition of the second verification value here is also a part of the process of integrity protection of the at least one first response message. In order to facilitate a clearer explain on how the terminal processes subsequently based on the at least one first response message, the operation of adding the second verification value is emphasized in the embodiment.

In the embodiment, after issuing the at least one digital certificate, the server constructs the at least one first response message (or a certificate response message) according to requirements of protocol formats of C-V2X related specifications, and performs calculation based on certain bits in the at least one first request message, to obtain the second verification value, add the second verification value to the at least one first response message, and transmit the processed at least one first response message to the terminal device. Exemplarily, the at least one first response message may be carried by a HTTP message, for example, the at least one first response message may be carried by the HTTP 200 OK message.

Figure 6:
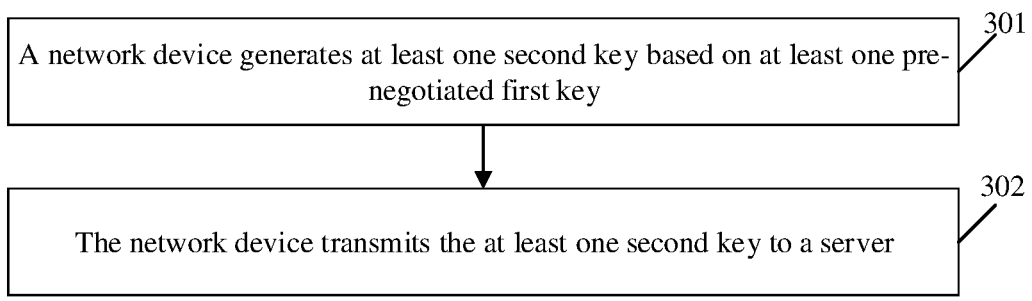
FIG. 6 is a third schematic flowchart of a method for configuring a terminal device according to an embodiment of the disclosure.

Based on the foregoing embodiments, an embodiment of the disclosure further provides a method for configuring a terminal device. FIG. 6 is a third schematic flowchart of a method for configuring a terminal device according to an embodiment of the disclosure. As shown in FIG. 6, the method includes the following operations 301 and 302.

At 301, a network device generates at least one second key based on at least one at least one pre-negotiated first key.

At 302, the network device transmits the at least one second key to a server.

In the embodiment, the network device may specifically be a NAF/AP. The terminal device performs the GBA authentication process or the AKMA authentication process, and starts to establish a secure access connection (or referred to as a secure channel, a secure link, etc.) with the server. After authentication is completed, the terminal device has negotiated the at least one first key with the network device, and the at least one first key may also be referred to as a shared session key(s).

In some optional embodiments, the network device may receive the at least one second request message from the server, the at least one second request message is configured to request the at least one second key; the network device generates the at least one second key based on the at least one pre-negotiated first key, and then transmits the at least one second response message to the server, the at least one second response message includes the at least one second key, thereby allowing the server to obtain the at least one second key. In some other optional embodiments, after receiving the at least one first request message transmitted by the terminal device for requesting the at least one digital certificate, the network device may also generate the at least one second key based on the at least one pre-negotiated first key, and transmit the at least one second key to the server in a process of transmitting the at least one first request message to the server.

In some optional embodiments of the disclosure, the method further includes the following operations. The network device negotiates the at least one first key with the terminal device through performing a GBA authentication process or an AKMA authentication process with the terminal device.

When the technical solutions of the embodiments of the disclosure are used, secure configuration of the at least one digital certificate of the C-V2X terminal device may be achieved in a "one-click configuration" manner based on a GBA mechanism, without modifying security environments of production lines and without filling by professional security organizations, which improves configuration flexibility of the at least one digital certificate, and reduces deployment difficulty and investment costs.

The method for configuring a terminal device according to the embodiment of the disclosure will be described below in combination with specific scenarios.

Figure 7A:
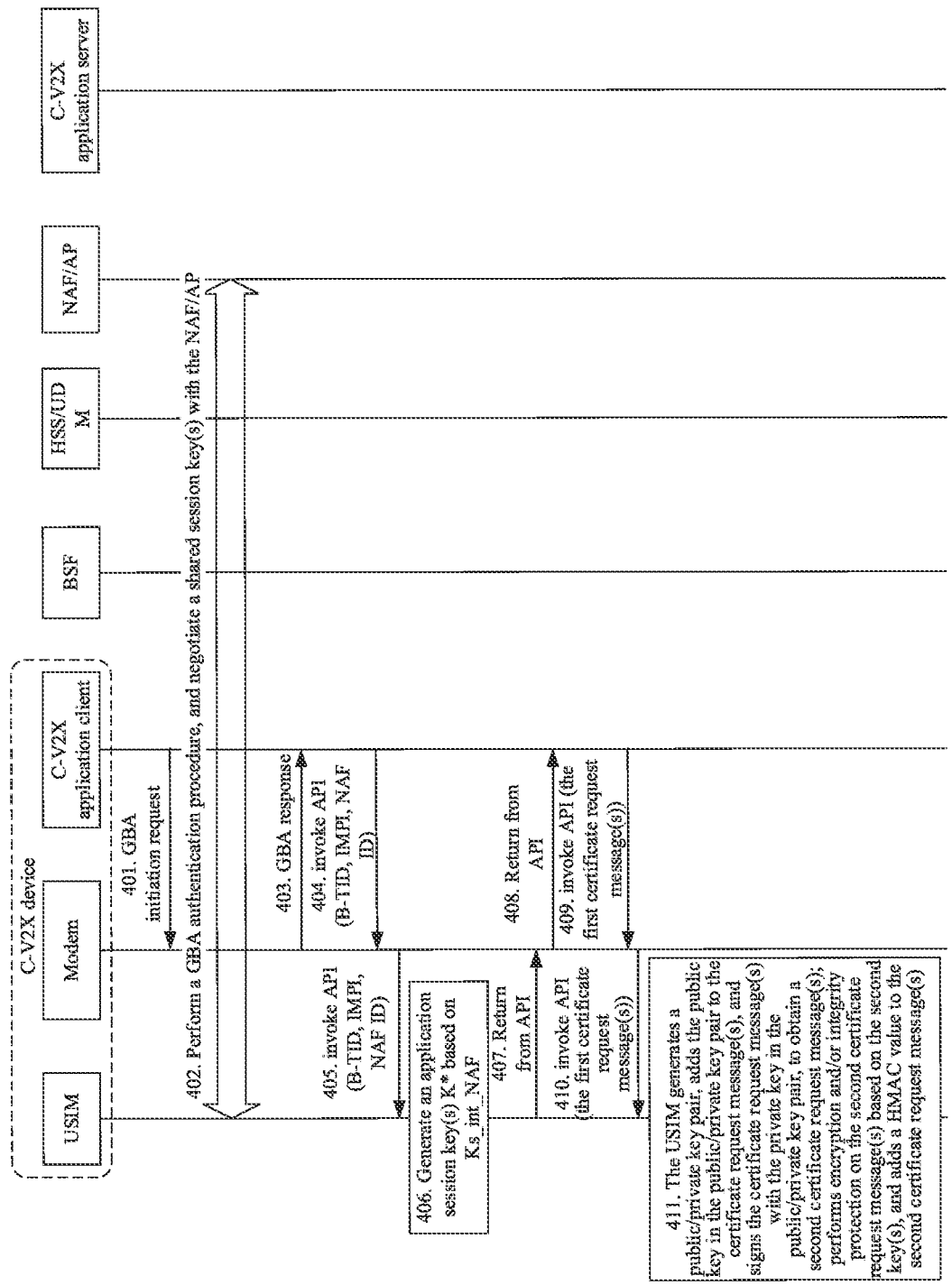
FIG. 7A and FIG. 7B is illustrate a first schematic diagram of an interaction process of a method for configuring a terminal device according to an embodiment of the disclosure.
Figure 7B:
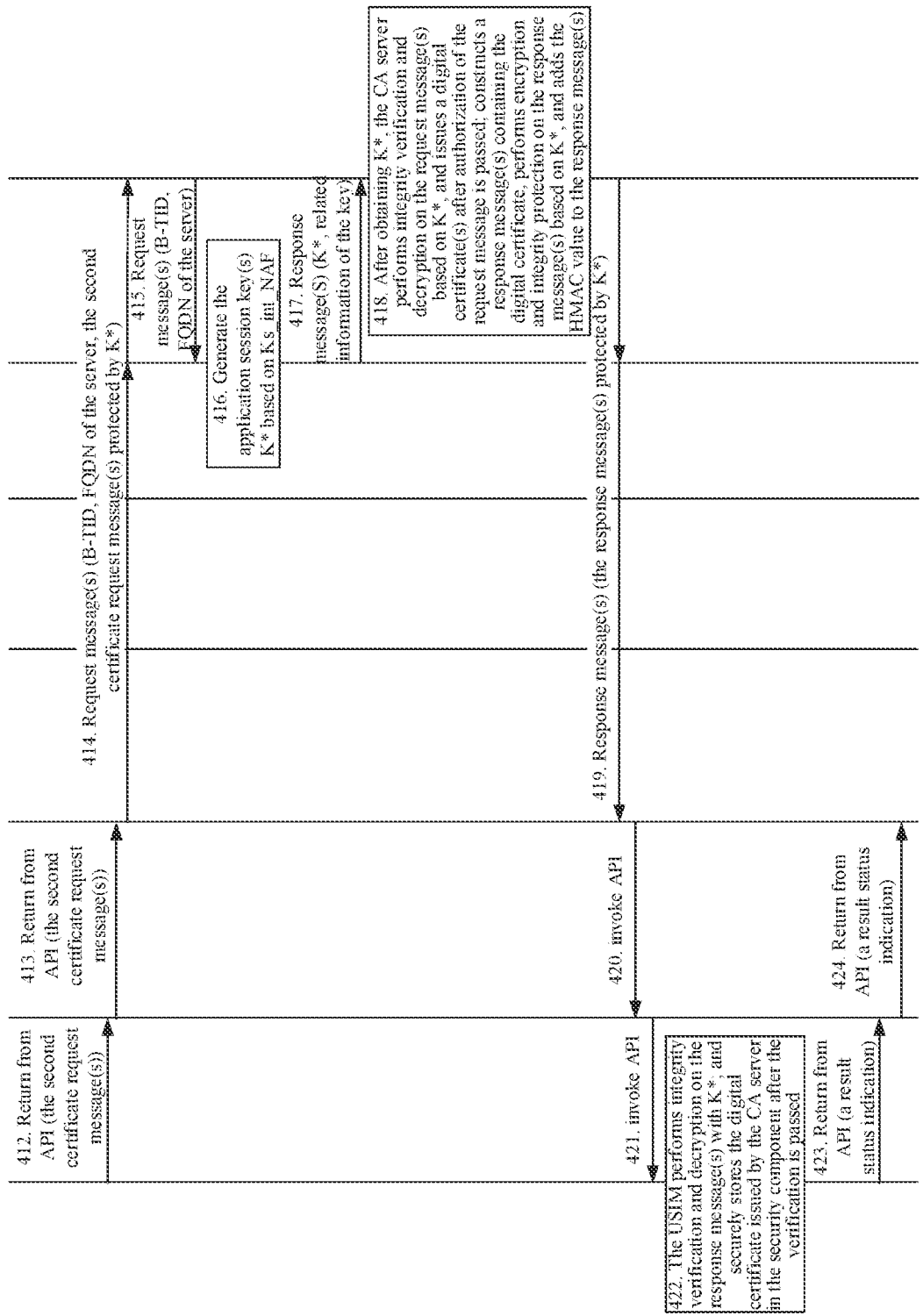

In the example, descriptions are made by an example of a C-V2X device used as the terminal device and a NAF/AP used as the network device. The C-V2X device includes a USIM, a modem and an application client; the modem may also be referred to as a device modem, the application client may also be referred to as a C-V2X application client, and the CA server in the foregoing embodiments is referred to as an application server or a C-V2X application server in the example. FIGS. 7A and 7B are a first schematic diagram of interaction processes of a method for configuring a terminal device according to an embodiment of the disclosure. As shown in FIGS. 7A and 7B, the method includes the following operations 401 to 424.

At 401, the C-V2X application client initiates a GBA starting request to the modem.

When it needs to initialize the C-V2X device and configure the at least one digital certificate for the C-V2X device, the application client calls the underlying modem through the GBA interface library to start the GBA authentication process, and starts to establish a secure access connection to the CA server (such as the ECA server).

At 402, a GBA authentication process is performed, and a shared session key(s) Ks_int_NAF (i.e., the at least one first key in the foregoing embodiments) is negotiated with the NAF/AP.

At 403, the modem transmits a GBA response corresponding to the GBA starting request to the C-V2X application client.

At 404 to 408, in case of using a GBA enhancement technology, the C-V2X application client transmits at least one message to the USIM by calling an interface, that is, by calling the USIM interface library (such as the USIM reconstruction certificate request interface) to trigger the USIM to generate an application session key(s) K* (i.e., the at least one second key) based on Ks_int_NAF; the USIM transmits at least one message to the C-V2X application client through the modem and by returning through an interface, that is, by calling the USIM interface library, to inform the C-V2X application client that the application session key(s) K* has been generated.

Exemplarily, the at least one message transmitted by the C-V2X application client to the USIM may carry the B-TID, an Internet Protocol Multimedia Private Identity (IMPI) and a NAF identifier (ID); after receiving the at least one message, the USIM generates the application session key(s) K* based on Ks_int_NAF.

At 409 and 410, the C-V2X application client constructs at least one certificate request message (i.e., the foregoing first certificate request message) and prepares to apply for at least one digital certificate from the CA server. The C-V2X application client transmits at least one message to the USIM through the modem and by calling an interface, that is, by calling the USIM reconstruction certificate request interface. The transmitted at least one message carries the prepared at least one certificate request message (i.e., the at least one first certificate request message in the foregoing embodiments).

At 411, after receiving the at least one certificate request message, the USIM generates a public/private key pair, adds the public key in the public/private key pair to the at least one certificate request message, and signs the at least one certificate request message with the private key in the public/private key pair, to obtain at least one second certificate request message; performs encryption and/or integrity protection on the at least one second certificate request message based on the at least one second key, and adds a HMAC value to the at least one second certificate request message.

Specifically, the USIM performs the following operations:
1) generating a required pair of cryptographic public and private keys for the EC digital certificate by using the random number generator inside the UICC;
2) improving the at least one certificate request message according to protocol requirements of C-V2X related specifications, and adding the public key in the generated public/private key pair to the at least one certificate request message;
3) aigning the at least one certificate request message with the private key in the public/private key pair; and
4) performing encryption and/or integrity protection on the at least one certificate request message with the application session key(s) K*, and adding the HMAC value to the at least one message, to obtain the at least one second certificate request message.

At 412 and 413, the USIM transmits at least one message to the C-V2X application client through the modem and by returning through an interface, that is, by calling the USIM interface library, and the transmitted message contains the at least one second certificate request message encrypted and/or integrity-protected by the application session key(s) K*.

At 414, the C-V2X application client transmits at least one request message to the CA server, and the at least one request message carries information such as the at least one second certificate request message protected by K*, the B-TID, a FQDN of the server, etc.

Exemplarily, the at least one request message is transmitted to the CA server through the NAF/AP.

At 415 to 417, the CA server interacts with the NAF/AP through a pre-established secure channel, requests the NAF/AP to generate the application session key(s) K* based on Ks_int_NAF, and obtains the application session key(s) K* and related information thereof. For example, the related information may include lifetime of the application session key(s) K*, etc.

The NAF/AP may transmit the application session key(s) K* and related information thereof to the CA server through an HTTP 200 OK response message.

The at least one request message transmitted by the CA server to the NAF/AP may further include information such as the B-TID, the FQDN of the server, etc.

At 418, after obtaining the application session key(s) K*, the CA server performs at least integrity verification or decryption on the at least one request message based on the application session key(s) K*, and issues at least one digital certificate after authorization of the at least one request message is passed; constructs at least one response message containing the at least one digital certificate, performs encryption and/or integrity protection on the at least one response message based on the application session key(s) K*, and adds the HMAC value to the at least one response message.

Specifically, the CA server may perform the following operations:
1) verifying the HMAC value of the at least one request message with the application session key(s) K*, and decrypting the at least one message;
2) performing authorization inspection on the at least one certificate request message, and issuing the at least one digital certificate for the C-V2X device when the authorization inspection is passed;
3) constructing the at least one response message according to protocol requirements of C-V2X related specifications, the at least one response message includes the issued digital certificate; and
4) performing encryption and integrity protection on the at least one response message with the application session key(s) K*, and adding the HMAC value to the at least one response message.

At 419, the CA server returns the at least one response message protected by the application session key(s) K* to the C-V2X application client. Exemplarily, the at least one response message may be carried by the HTTP 200 OK message.

At 420 and 421, the C-V2X application client transmits at least one message to the USIM through the modem and by calling an interface, that is, by calling a USIM security inspection interface. The transmitted message carries the at least one response message protected by the application session key(s) K*.

At 422 to 424, the USIM performs at least integrity verification or decryption on the at least one response message with the application session key(s) K*; and securely stores the at least one digital certificate issued by the CA server in the security component after the verification is passed, and transmits a result status indication to the C-V2X application client through the modem and by returning through an interface.

Figure 8:
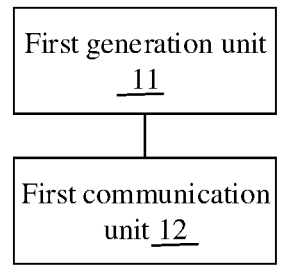
FIG. 8 is a first schematic diagram of a compositional structure of an apparatus for configuring a terminal device according to an embodiment of the disclosure.

An embodiment of the disclosure further provides an apparatus for configuring a terminal device, which is applied to the terminal device. FIG. 8 is a first schematic diagram of compositional structures of an apparatus for configuring a terminal device according to an embodiment of the disclosure. As shown in FIG. 8, the apparatus includes a first generation unit 11 and a first communication unit 12.

The first generation unit 11 is configured to generate at least one second key based on at least one first key, and perform encryption and/or integrity protection on at least one certificate request message based on the at least one second key.

The first communication unit 12 is configured to transmit at least one first request message which includes the at least one certificate request message encrypted and/or integrity-protected by the at least one second key.

In some optional embodiments of the disclosure, the first communication unit 12 is further configured to receive at least one first response message from a server, perform at least integrity verification or decryption on the at least one first response message based on the at least one second key, and obtain at least one digital certificate carried in the at least one first response message.

In some optional embodiments of the disclosure, the first generation unit 11 includes an application client, a modem and a USIM.

The application client is configured to trigger the USIM through the modem, to generate the at least one second key based on the at least one first key, and is further configured to generate at least one first certificate request message, and transmit the at least one first certificate request message to the USIM through the modem.

The USIM is configured to: generate a public/private key pair, add the public key in the public/private key pair to the at least one first certificate request message, and sign the at least one first certificate request message with the private key in the public/private key pair, to obtain at least one second certificate request message; perform encryption and/or integrity protection on the at least one second certificate request message based on the at least one second key, and add a first verification value to the at least one second certificate request message; and transmit the at least one second certificate request message encrypted and/or integrity-protected by the at least one second key to the application client through the modem.

In some optional embodiments of the disclosure, the application client is configured to transmit the at least one first request message to a server through the first communication unit 12, the at least one first request message includes the at least one second certificate request message encrypted and/or integrity-protected by the at least one second key, and the at least one first request message further includes at least a B-TID or a FQDN of the server.

In some optional embodiments of the disclosure, the first generation unit 11 includes an application client, a modem and a USIM.

The application client is configured to receive the at least one first response message from the server through the first communication unit 12, and transmit the at least one first response message to the USIM through the modem.

The USIM is configured to: perform at least integrity verification or decryption on the at least one first response message based on the at least one second key; and obtain the at least one digital certificate carried in the at least one first response message after the verification is passed, and store the at least one digital certificate in a security component.

In some optional embodiments of the disclosure, the apparatus further includes a first execution unit. The first execution unit is configured to perform a GBA authentication process or an AKMA authentication process, and negotiate the at least one first key with a network device.

In the embodiments of the disclosure, each of the first generation unit 11, the first communication unit 12 and the first execution unit in the apparatus may be implemented by a CPU, a Digital Signal Processor (DSP), a Microcontroller Unit (MCU) or a Field-Programmable Gate Array (FPGA) in combination with a communication modular assembly (including a basic communication suite, an operating system, a communication module, a standardized interface, a protocol, etc.) and a transceiver antenna, in an actual application.

Figure 9:
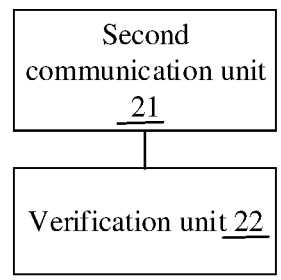
FIG. 9 is a second schematic diagram of a compositional structure of an apparatus for configuring a terminal device according to an embodiment of the disclosure.

An embodiment of the disclosure further provides an apparatus for configuring a terminal device, which is applied to a server. FIG. 9 is a second schematic diagram of compositional structures of an apparatus for configuring a terminal device according to an embodiment of the disclosure. As shown in FIG. 9, the apparatus includes a second communication unit 21 and a verification unit 22.

The second communication unit 21 is configured to receive at least one first request message from the terminal device, the at least one first request message includes at least one certificate request message encrypted and/or integrity-protected by at least one second key.

The verification unit 22 is configured to obtain the at least one second key from a network device, the at least one second key is generated by the network device based on at least one first key; and is further configured to perform at least integrity verification or decryption on the at least one first request message based on the at least one second key, and issue at least one digital certificate after authorization of the at least one first request message is passed.

The second communication unit 22 is further configured to transmit at least one first response message to the terminal device, the at least one first response message includes the at least one digital certificate.

In some optional embodiments of the disclosure, the second communication unit 21 is configured to construct the at least one first response message containing the at least one digital certificate, perform encryption and/or integrity protection on the at least one first response message based on the at least one second key, add a second verification value to the at least one first response message, and transmit the processed at least one first response message to the terminal device.

In some optional embodiments of the disclosure, the at least one first request message further includes a B-TID.

The apparatus further includes a second execution unit. The second execution unit is configured to query whether there is at least one second key corresponding to the B-TID, and obtain the at least one second key from the network device through the second communication unit, in response to the querying result indicating that there is no second key corresponding to the B-TID.

In some optional embodiments of the disclosure, the second communication unit 21 is configured to: transmit at least one second request message to the network device, the at least one second request message is configured to request the at least one second key; and receive at least one second response message transmitted by the network device, the at least one second response message includes the at least one second key.

In the embodiments of the disclosure, each of the second communication unit 21, the verification unit 22 and the second execution unit in the apparatus may be implemented by a CPU, a DSP, a MCU or a FPGA in combination with a communication modular assembly (including a basic communication suite, an operating system, a communication module, a standardized interface, a protocol, etc.) and a transceiver antenna, in an actual application.

Figure 10:
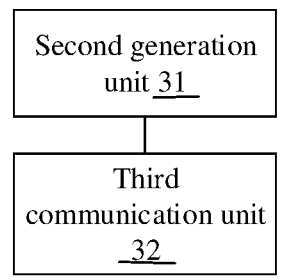
FIG. 10 is a third schematic diagram of a compositional structure of an apparatus for configuring a terminal device according to an embodiment of the disclosure.

An embodiment of the disclosure further provides an apparatus for configuring a terminal device, which is applied to a network device. FIG. 10 is a third schematic diagram of compositional structures of an apparatus for configuring a terminal device according to an embodiment of the disclosure. As shown in FIG. 10, the apparatus includes a second generation unit 31 and a third communication unit 32.

The second generation unit 31 is configured to generate at least one second key based on at least one at least one pre-negotiated first key.

The third communication unit 32 is configured to transmit the at least one second key to a server.

In some optional embodiments of the disclosure, the apparatus further includes a third execution unit. The third execution unit is configured to negotiate the at least one first key with the terminal device through performing a GBA authentication process or an AKMA authentication process with the terminal device.

In some optional embodiments of the disclosure, the second generation unit 31 is configured to generate at least one corresponding second key for each server based on the at least one pre-negotiated first key.

The third communication unit 32 is configured to transmit the corresponding second key to each server respectively.

In some optional embodiments of the disclosure, the third communication unit 32 is configured to: receive at least one second request message transmitted by the server, the at least one second request message is configured to request the at least one second key; and transmit at least one second response message to the server, the at least one second response message includes the at least one second key generated by the second generation unit 31.

In the embodiments of the disclosure, each of the second generation unit 31, the third communication unit 32 and the third execution unit in the apparatus may be implemented by a CPU, a DSP, a MCU or a FPGA in combination with a communication modular assembly (including a basic communication suite, an operating system, a communication module, a standardized interface, a protocol, etc.) and a transceiver antenna, in an actual application.

It should be noted that when the apparatuses for configuring a terminal device provided in the above embodiments are configured, division of the above program modules is exemplified only. In an actual application, the above processing may be allocated to be completed by different program modules according to requirements, that is, internal structures of the apparatus are divided into different program modules, to complete all or part of the above processing. Furthermore, the apparatuses for configuring a terminal device provided in the above embodiments belong to the same concept as embodiments of the methods for configuring a terminal device, and specific implementation processes thereof refer to the method embodiments for the details, and are not elaborated here.

Figure 11:
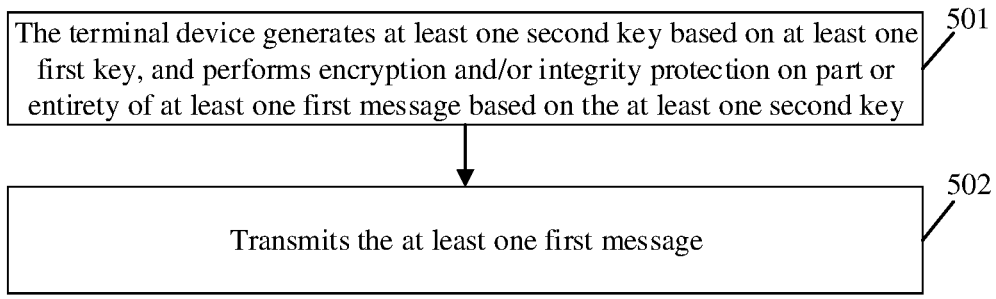
FIG. 11 is a fourth schematic flowchart of a method for configuring a terminal device according to an embodiment of the disclosure.

An embodiment of the disclosure further provides a method for configuring a terminal device. FIG. 11 is a fourth schematic flowchart of a method for configuring a terminal device according to an embodiment of the disclosure. As shown in FIG. 11, the method includes the following operations 501 and 502.

At 501, the terminal device generates at least one second key based on at least one first key, and performs encryption and/or integrity protection on part or entirety of at least one first message based on the at least one second key.

At 502, the terminal device transmits the at least one first message.

The method for configuring a terminal device (hereinafter, abbreviated as the method) of the embodiment is applied to the terminal device, and the terminal device may specifically be an Internet of Vehicles terminal device (it may also be referred to as a C-V2X device). In some optional embodiments, for example, the Internet of Vehicles terminal device may be an OBU, a RSU, etc.; in some other optional embodiments, the Internet of Vehicles terminal device may also be a pedestrian's hand-held device, wearable device, etc.

In some optional embodiments of the disclosure, the method further includes the following operations. The terminal device performs a GBA authentication process or an AKMA authentication process, and negotiates the at least one first key with a network device. Specific processes thereof may refer to detailed descriptions of the methods for configuring a terminal device in the foregoing embodiments for the details, and are not elaborated here.

In some optional embodiments of the disclosure, the terminal device includes an application client, a modem and a USIM. The operation of generating, by the terminal device, the at least one second key based on the at least one first key, and performing, by the terminal device, encryption and/or integrity protection on part or entirety of the at least one first message based on the at least one second key includes the following operations. The application client triggers the USIM through the modem, to generate the at least one second key based on the at least one first key. The application client generates the at least one first message, and transmits the at least one first message to the USIM through the modem. The USIM performs encryption and/or integrity protection on part or entirety of the at least one first message based on the at least one second key. The USIM transmits the processed at least one first message to the application client through the modem.

In the embodiment, the at least one second key may be composed of only one key, or may be composed of multiple keys (that is, multiple keys here are all generated based on the at least one first key, and are collectively referred to as the at least one second key). In a feasible implementation, the at least one second key is composed of multiple keys, for example, the at least one second key may include an encryption key(s) and/or an integrity protection key(s); of course, the at least one second key may also include other types of keys according to actual requirements, which is not elaborated here. Further, the USIM performs encryption and/or integrity protection on part or entirety of the at least one first message based on the at least one second key. Specific processes of encryption and/or integrity protection may refer to descriptions in the foregoing embodiments, and are not elaborated here.

In the embodiment, the at least one first message may be any message, information or the like transmitted by the terminal device to a server.

In some optional embodiments of the disclosure, the operation of transmitting the at least one first message includes the following operations. The application client transmits the at least one first message to a server. The at least one first message further includes at least a B-TID or a FQDN of the server, or includes at least an A-KID or the FQDN.

In some optional embodiments of the disclosure, the method further includes the following operations. The terminal device receives at least one second message from a server, and performs at least integrity verification or decryption on the at least one second message based on the at least one second key.

In the embodiment, the at least one second message may be any message, information or the like transmitted by the server to the terminal device.

In some optional embodiments of the disclosure, the terminal device includes an application client, a modem and a USIM. The operation of receiving, by the terminal device, the at least one second message from the server, and performing, by the terminal device, at least integrity verification or decryption on the at least one second message based on the at least one second key includes the following operations. The application client receives the at least one second message from the server, and transmits the at least one second message to the USIM through the modem. The USIM performs at least integrity verification or decryption on the at least one second message based on the at least one second key.

In the embodiment, the application client receives the at least one second message from the server, calls a USIM security inspection interface to transmit the at least one second message to the USIM through the modem; of course, the interface in the embodiment is not limited to the USIM security inspection interface, and other interfaces for security inspection may also fall within the scope of protection of the embodiment of the disclosure. The USIM performs at least integrity verification or decryption on the at least one second message based on the at least one second key. Specific processes of integrity verification and/or decryption may refer to descriptions in the foregoing embodiments, and are not elaborated here. Further, the USIM returns a plaintext information and/or processing result obtained by decryption to the application client.

Figure 12:
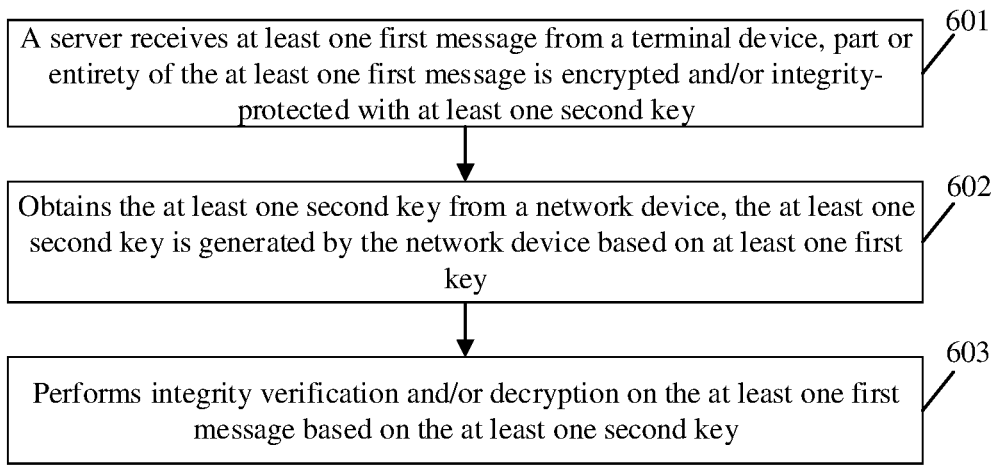
FIG. 12 is a fifth schematic flowchart of a method for configuring a terminal device according to an embodiment of the disclosure.

Based on the foregoing embodiments, an embodiment of the disclosure further provides a method for configuring a terminal device. FIG. 12 is a fifth schematic flowchart of a method for configuring a terminal device according to an embodiment of the disclosure. As shown in FIG. 12, the method includes the following operations 601 to 603.

At 601, a server receives at least one first message from the terminal device, part or entirety of the at least one first message is encrypted and/or integrity-protected by at least one second key.

At 602, the server obtains the at least one second key from a network device, the at least one second key is generated by the network device based on at least one first key.

At 603, the server performs at least integrity verification or decryption on the at least one first message based on the at least one second key.

In the embodiment, with the user's "one-click" trigger, the terminal device may automatically complete operations such as server access authentication, secure channel establishment, key generation or the like based on a GBA technical mechanism or an AKMA authentication mechanism, to implement initial secure configuration of the terminal device.

In the embodiment, the server receives the at least one first message from the terminal device through the established secure channel. Exemplarily, the server may receive the at least one first message from the terminal device through the network device, that is, the at least one first request message is sent from the terminal device and reaches the network device, and then the at least one first message is transmitted to the server through the network device.

In the embodiment, since part or entirety of the at least one first message is encrypted and/or integrity-protected by the at least one second key, the server needs to obtain the at least one second key. Exemplarily, the server obtains the at least one second key from the network device. In a process of the terminal device performing the GBA authentication process or the AKMA authentication process, the terminal device negotiates the at least one first key with the network device, and the at least one first key may also be referred to as a shared session key(s).

In some optional implementations, the operation of obtaining, by the server, the at least one second key from the network device includes the following operations. The server transmits a third message to the network device, the third message is configured to request the at least one second key. The server receives a fourth message transmitted by the network device, the fourth message includes the at least one second key.

In the embodiment, the server may transmit the third message to the network device, the third message is configured to request the at least one second key; after receiving the third message, the network device generates the at least one second key based on the at least one pre-negotiated first key, and then transmits the fourth message to the server, the fourth message includes the at least one second key, thereby allowing the server to obtain the at least one second key.

In some other optional implementations, after receiving the at least one first message transmitted by the terminal device, the network device may also generate the at least one second key based on the at least one pre-negotiated first key, and transmit the at least one second key to the server in a process of transmitting the at least one first message to the server.

In some optional embodiments of the disclosure, the at least one first message further includes a B-TID or an A-KID. The operation of obtaining, by the server, the at least one second key from the network device includes the following operations. The server queries whether there is at least one second key corresponding to the B-TID or the A-KID. The server obtains the at least one second key from the network device, in response to the querying result indicating that there is no second key corresponding to the B-TID or the A-KID.

In the embodiment, the server may obtain the at least one second key corresponding to the B-TID in advance. After receiving the at least one first request message, whether there is at least one second key corresponding to the B-TID may be queried first through the B-TID carried in the at least one first request message; in case that the querying result indicates that there is no second key corresponding to the B-TID, the at least one second key from the network device is obtained; in case that there is at least one second key corresponding to the B-TID, the at least one second key corresponding to the B-TID may be directly obtained.

In some optional embodiments of the disclosure, the method further includes the following operations. The server performs encryption and/or integrity protection on part or entirety of at least one second message based on the at least one second key. The at least one second message is transmitted.

In the embodiment, when the server is to transmit the at least one second message to the terminal device, the server constructs the at least one second message according to requirements of protocol formats of relevant specifications, specifically, performs encryption and/or integrity protection on part or entirety of the at least one second message based on the at least one second key. Specific processes of encryption and/or integrity protection may refer to descriptions in the foregoing embodiments, and are not elaborated here.

The method for configuring a terminal device according to the embodiment of the disclosure will be described below in combination with specific scenarios.

Figure 13:
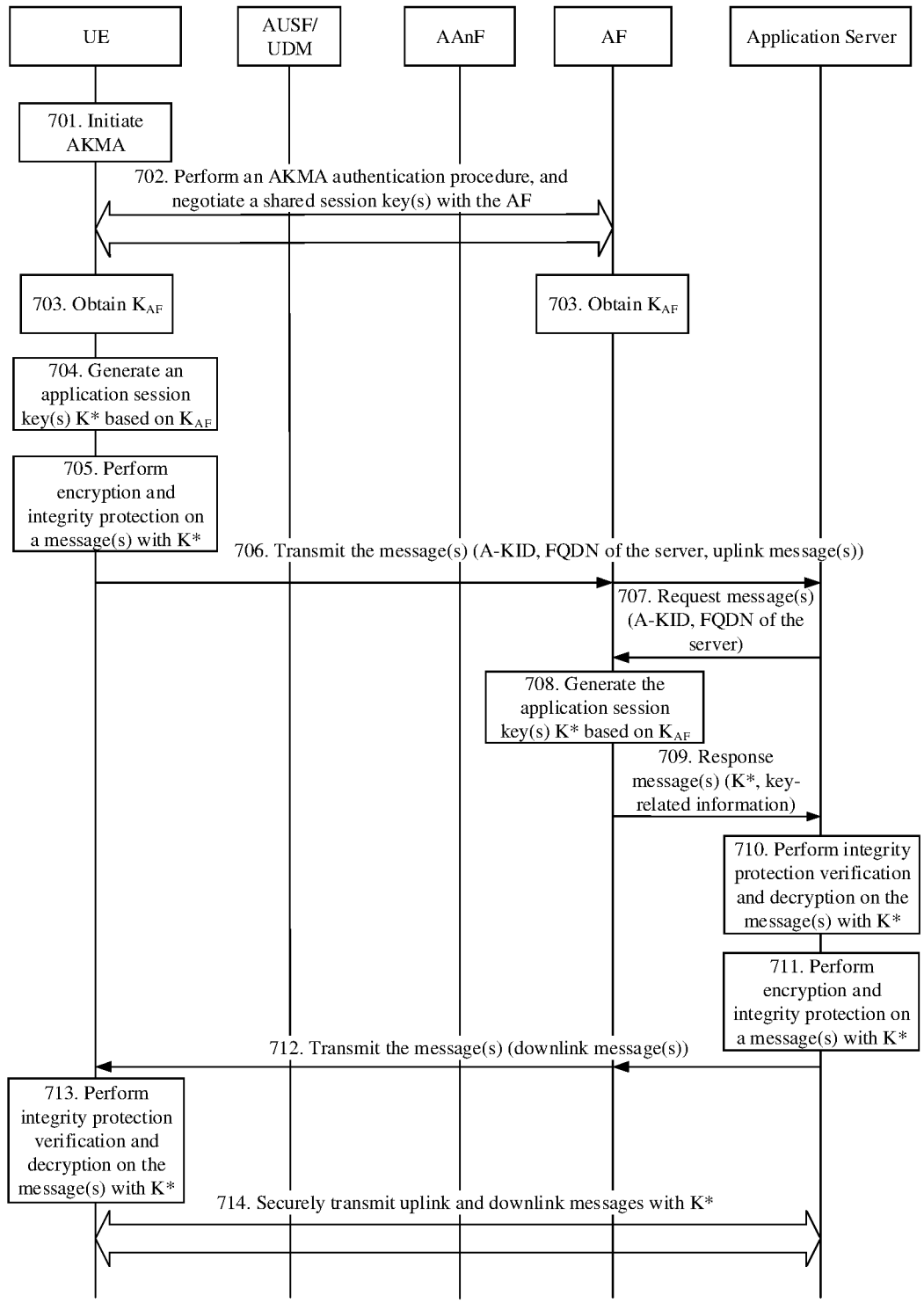
FIG. 13 is a second schematic diagram of an interaction process of a method for configuring a terminal device according to an embodiment of the disclosure.

In the example, descriptions are made by an example of a User Equipment (UE) used as the terminal device and an Application Function (AF) used as the network device. The UE device includes a USIM, a modem and an application client; the modem may also be referred to as a device modem, the application client may also be referred to as a C-V2X application client, and the server in the foregoing embodiments is referred to as an application server or a C-V2X application server in the example. FIG. 13 is a second schematic diagram of interaction processes of a method for configuring a terminal device according to an embodiment of the disclosure. As shown in FIG. 13, the method includes the following operations 701 to 714.

At 701, the UE starts AKMA.

When it needs to initialize the C-V2X device and configure the at least one digital certificate for the C-V2X device, the application client calls the underlying modem through the GBA interface library to start the GBA authentication process, and starts to establish a secure access connection to the CA server (such as the ECA server).

At 702, the UE performs an AKMA authentication process, and negotiates a shared session key(s) $K_{AF}$ (i.e., the at least one first key in the foregoing embodiments) with the AF.

At 703, the UE obtains the shared session key(s) $K_{AF}$.

At 704 and 705, the UE generates an application session key(s) K* based on the shared session key(s) $K_{AF}$, and performs encryption and/or integrity protection on at least one message (uplink message) with the application session key(s) K*.

Exemplarily, the application client transmits at least one message to the USIM through the modem, and the at least one message may carry information such as B-TID, etc.; after receiving the at least one message, the USIM generates the application session key(s) K* based on the shared session key(s) $K_{AF}$, performs encryption or integrity protection on part or entirety of the at least one message with the application session key(s) K*, and transmits the processed at least one message to the application client through the modem.

At 706, the UE transmits the at least one message (i.e., uplink message) to the application server, and the at least one message carries information such as the uplink message protected by the application session key(s) K*, the B-TID, a FQDN of the server, etc.

Exemplarily, the at least one message is transmitted to the application server through the AF At 707 to 709, the application server interacts with the AF through a pre-established secure channel, requests the AF to generate the application session key(s) K* based on the shared session key(s) $K_{AF}$, and obtains the application session key(s) K* and related information thereof. For example, the related information may include lifetime of the application session key(s) K*, etc.

The AF may transmit the application session key(s) K* and related information thereof to the application server through an HTTP 200 OK response message.

The at least one request message transmitted by the application server to the AF may further include information such as the B-TID, the FQDN of the server, etc.

At 710, after obtaining the application session key(s) K*, the application server performs at least integrity verification or decryption on the at least one message with the application session key(s) K*.

Processes of transmitting the uplink message between the terminal and the application server are as above.

At 711, the application server performs encryption and/or integrity protection on at least one message (downlink message) with the application session key(s) K*.

At 712, the application server transmits the at least one message (downlink message) to the UE.

At 713, the UE performs at least integrity verification or decryption on the at least one message with the application session key(s) K*.

At 714, uplink and downlink messages may be securely transmitted between the UE and the application server with the application session key(s) K*.

Figure 14:
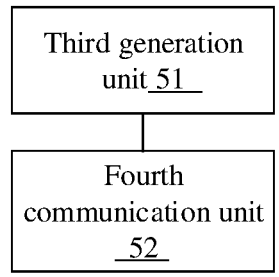
FIG. 14 is a fourth schematic diagram of a compositional structure of an apparatus for configuring a terminal device according to an embodiment of the disclosure.

Based on the foregoing embodiments, an embodiment of the disclosure further provides an apparatus for configuring a terminal device, which is applied to the terminal device. FIG. 14 is a fourth schematic diagram of compositional structures of an apparatus for configuring a terminal device according to an embodiment of the disclosure. As shown in FIG. 14, the apparatus includes a third generation unit 51 and a fourth communication unit 52.

The third generation unit 51 is configured to generate at least one second key based on at least one first key, and perform encryption and/or integrity protection on part or entirety of at least one first message based on the at least one second key.

The fourth communication unit 52 is configured to transmit the at least one first message.

In some optional embodiments of the disclosure, the fourth communication unit 52 is further configured to receive at least one second message from a server, and perform at least integrity verification or decryption on the at least one second message based on the at least one second key.

In some optional embodiments of the disclosure, the third generation unit 51 includes an application client, a modem and a USIM.

The application client is configured to trigger the USIM through the modem, to generate the at least one second key based on the at least one first key, and is further configured to generate the at least one first message, and transmit the at least one first message to the USIM through the modem.

The USIM is configured to perform encryption and/or integrity protection on part or entirety of the at least one first message based on the at least one second key, and is further configured to transmit the processed at least one first message to the application client through the modem.

In some optional embodiments of the disclosure, the application client is further configured to transmit the at least one first message to a server.

The at least one first message further includes at least a B-TID or a FQDN of the server, or includes at least an A-KID or the FQDN.

In some optional embodiments of the disclosure, the third generation unit 51 includes an application client, a modem and a USIM.

The application client is configured to receive the at least one second message from the server, and transmit the at least one second message to the USIM through the modem.

The USIM is configured to perform at least integrity verification or decryption on the at least one second message based on the at least one second key.

In the embodiments of the disclosure, each of the third generation unit 51 and the fourth communication unit 52 in the apparatus may be implemented by a CPU, a DSP, a MCU or a FPGA in combination with a communication modular assembly (including a basic communication suite, an operating system, a communication module, a standardized interface, a protocol, etc.) and a transceiver antenna, in an actual application.

Figure 15:
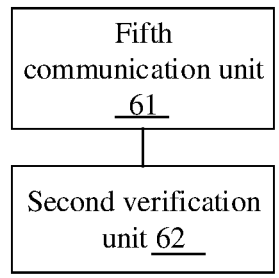
FIG. 15 is a fifth schematic diagram of a compositional structure of an apparatus for configuring a terminal device according to an embodiment of the disclosure.

An embodiment of the disclosure further provides an apparatus for configuring a terminal device, which is applied to a server. FIG. 15 is a fifth schematic diagram of compositional structures of an apparatus for configuring a terminal device according to an embodiment of the disclosure. As shown in FIG. 15, the apparatus includes a fifth communication unit 61 and a second verification unit 62.

The fifth communication unit 61 is configured to receive at least one first message from the terminal device, part or entirety of the at least one first message is encrypted and/or integrity-protected by at least one second key.

The second verification unit 62 is configured to obtain the at least one second key from a network device, the at least one second key is generated by the network device based on at least one first key, and the second verification unit 62 is further configured to perform at least integrity verification or decryption on the at least one first message based on the at least one second key.

In some optional embodiments of the disclosure, the apparatus further includes a fourth generation unit. The fourth generation unit is configured to perform encryption and/or integrity protection on part or entirety of at least one second message based on the at least one second key.

The fifth communication unit 61 is further configured to transmit the at least one second message.

In some optional embodiments of the disclosure, the at least one first message further includes a B-TID or an A-KID.

The apparatus further includes a fourth execution unit. The fourth execution unit is configured to query whether there is at least one second key corresponding to the B-TID or the A-KID.

The second verification unit 62 is configured to obtain the at least one second key from the network device through the fifth communication unit 61, in response to the querying result obtained by the fourth execution unit indicating that there is no second key corresponding to the B-TID or the A-KID.

In the embodiments of the disclosure, each of the fifth communication unit 61, the second verification unit 62 and the third execution unit in the apparatus may be implemented by a CPU, a DSP, a MCU or a FPGA in combination with a communication modular assembly (including a basic communication suite, an operating system, a communication module, a standardized interface, a protocol, etc.) and a transceiver antenna, in an actual application.

It should be noted that when the apparatuses for configuring a terminal device provided in the above embodiments are configured, division of the above program modules is exemplified only. In an actual application, the above processing may be allocated to be completed by different program modules according to requirements, that is, internal structures of the apparatus are divided into different program modules, to complete all or part of the above processing. Furthermore, the apparatuses for configuring a terminal device provided in the above embodiments belong to the same concept as embodiments of the methods for configuring a terminal device, and specific implementation processes thereof refer to the method embodiments for the details, and are not elaborated here.

Figure 16:
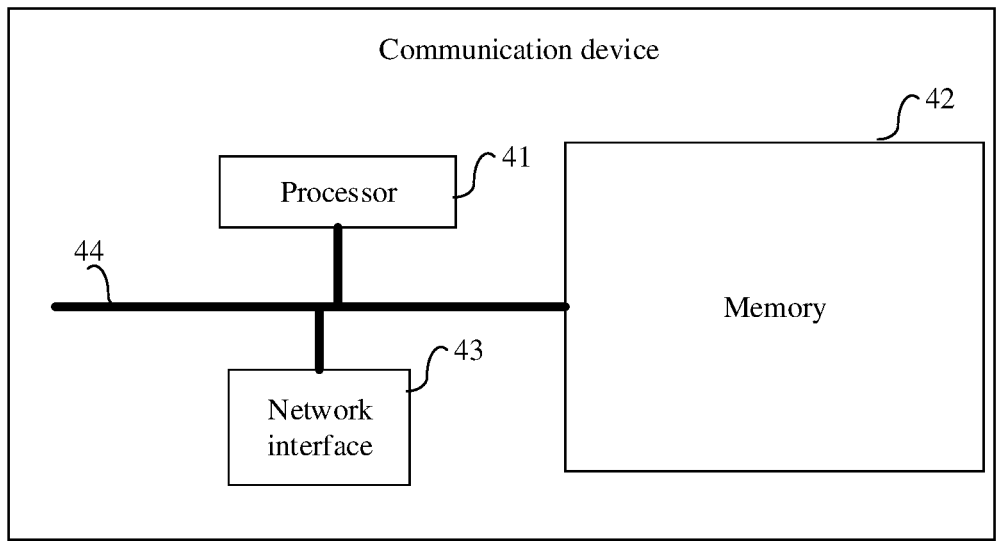
FIG. 16 is a schematic diagram of a hardware compositional structure of a communication device according to an embodiment of the disclosure.

An embodiment of the disclosure further provides a communication device. FIG. 16 is a schematic diagram of hardware compositional structures of a communication device according to an embodiment of the disclosure. As shown in FIG. 16, the communication device includes a memory 42, a processor 41, and a computer program stored on the memory 42 and executable on the processor 41, the processor 41 implements operations of the foregoing method for configuring a terminal device according to the embodiment of the disclosure which is applied to the terminal device, when the processor 41 executes the program; or, the processor 41 implements operations of the foregoing method for configuring a terminal device according to the embodiment of the disclosure which is applied to the server, when the processor 41 executes the program; or, the processor 41 implements operations of the foregoing method for configuring a terminal device according to the embodiment of the disclosure which is applied to the network device, when the processor 41 executes the program.

Optionally, the communication device may further include one or more network interfaces 43. It may be understood that various components in the communication device are coupled together through a bus system 44. It may be understood that the bus system 44 implements connection and communication between these components. The bus system 44 includes a power bus, a control bus and a status signal bus, in addition to a data bus. However, various buses are labeled as the bus system 44 in FIG. 16, for clarity of illustration.

It may be understood that the memory 42 may be a volatile memory or a non-volatile memory, and may also include both volatile and non-volatile memories. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM); the magnetic surface memory may be a magnetic disk memory or a magnetic tape memory. The volatile memory may be a Random Access Memory (RAM) used as an external cache. By way of exemplary descriptions rather than limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 42 described in the embodiment of the disclosure is intended to include, but is not limited to these memories and any other suitable types of memories.

The methods disclosed in the foregoing embodiments of the disclosure may be applied to the processor 41 or implemented by the processor 41. The processor 41 may be an integrated circuit chip with signal processing capability. During implementation, each operation of the above methods may be completed by an integrated logic circuit in form of hardware or instructions in form of software in the processor 41. The processor 41 may be a general-purpose processor, a DSP, or another programmable logic device, discrete gate or transistor logic device, discrete hardware component, etc. The processor 41 may implement or perform various methods, operations and logic block diagrams disclosed in the embodiments of the disclosure. The general-purpose processor may be a microprocessor or any conventional processor, etc. Operations of the methods disclosed in combination with the embodiments of the disclosure may be directly embodied as being performed and completed by a hardware decoding processor, or performed and completed by a combination of hardware and software modules in the decoding processor. The software module may be located in a storage medium, and the storage medium is located in the memory 42. The processor 41 reads information in the memory 42, and completes operations of the foregoing methods in combination with hardware thereof.

In an exemplary embodiment, the communication device may be implemented by one or more of an Application Specific Integrated Circuit (ASIC), a DSP, a Programmable Logic Device (PLD), a Complex Programmable Logic Device (CPLD), a FPGA, a general-purpose processor, a controller, a MCU, a microprocessor or other electronic components, to perform the foregoing methods.

In an exemplary embodiment, an embodiment of the disclosure further provides a computer-readable storage medium, such as the memory 42 including a computer program, and the computer program may be executed by the processor 41 of the communication device to complete operations of the foregoing methods. The computer-readable storage medium may be a FRAM, a ROM, a PROM, an EPROM, an EEPROM, a flash memory, a magnetic surface memory, an optical disk, or a CD-ROM, or other memories; the computer-readable storage medium may also be various devices including one or any combination of the above memories.

An embodiment of the disclosure further provides a computer-readable storage medium, having stored thereon a computer program, the program implements operations of the foregoing method for configuring a terminal device according to the embodiment of the disclosure which is applied to the terminal device, when the program is executed by a processor; or, the program implements operations of the foregoing method for configuring a terminal device according to the embodiment of the disclosure which is applied to the server, when the program is executed by the processor; or, the program implements operations of the foregoing method for configuring a terminal device according to the embodiment of the disclosure which is applied to the network device, when the program is executed by the processor.

Methods disclosed in several method embodiments provided in the disclosure may be arbitrarily combined without conflict, to obtain a new method embodiment.

Features disclosed in several product embodiments provided in the disclosure may be arbitrarily combined without conflict, to obtain a new product embodiment.

Features disclosed in several method or device embodiments provided in the disclosure may be arbitrarily combined without conflict, to obtain a new method or device embodiment.

In several embodiments provided in the disclosure, it should be understood that the disclosed devices and methods may be implemented in other ways. The above device embodiments are only exemplary. For example, division of the units is only a logical function division. In an actual implementation, there may be other division manners, for example, multiple units or components may be combined, or may be integrated into another system, or some features may be ignored, or may not be performed. Furthermore, coupling or direct coupling or communication connection between the components as shown or discussed may be indirect coupling or communication connection through some interfaces, devices or units, and may be in electrical, mechanical or other forms.

The above units described as separate components may be or may not be physically separated, and the components displayed as units may be or may not be physical units, that is, they may be located in one place or may be distributed to multiple network units; part or all of the units may be selected according to actual requirements, to achieve purposes of the solutions of the embodiments.

Furthermore, each functional unit in each embodiment of the disclosure may be integrated into a processing unit, or each unit may be used as a single unit respectively, or two or more units may be integrated into a unit; the above integrated unit may be implemented in form of hardware, or may be implemented in form of hardware plus software function units.

It may be understood by those of ordinary skill in the art that all or part of operations for implementing the above method embodiments may be completed by hardware related to program instructions, and the foregoing program may be stored in a computer-readable storage medium. When the program is executed, the program executes operations including the above method embodiments. The foregoing storage medium includes various media capable of storing program codes, such as a mobile storage device, a ROM, a RAM, a magnetic disk, or an optical disk, etc.

Or, when the above integrated unit of the disclosure is implemented in form of software function module and sold or used as an independent product, the integrated unit may also be stored in a computer-readable storage medium. Based on such understanding, the technical solutions of the embodiments of the disclosure substantially or parts making contributions to the related art may be embodied in form of software product, and the computer software product is stored in a storage medium, includes multiple instructions to enable a computer device (which may be a personal computer, a server, a network device, etc.) to perform all or part of the method in each embodiment of the disclosure. The foregoing storage medium includes various media capable of storing program codes, such as a mobile storage device, a ROM, a RAM, a magnetic disk, or an optical disk, etc.

The above descriptions are only specific implementations of the disclosure, however, the scope of protection of the disclosure is not limited thereto. Any variation or replacement apparent to those skilled in the art within the technical scope disclosed by the disclosure should fall within the scope of protection of the disclosure. Therefore, the scope of protection of the disclosure should be defined by the scope of protection of claims.

The invention claimed is:

1. A method for configuring a terminal device, comprising:
generating, by a Universal Subscriber Identity Module (USIM) of the terminal device, at least one first key, wherein the at least one first key is generated by the USIM through negotiation with a Bootstrapping Server Function (BSF);
generating, by the USIM of the terminal device, at least one second key based on at least one first key, and performing, by the USIM of the terminal device, at least encryption or integrity protection on at least one certificate request message based on the at least one second key;
transmitting, by the USIM of the terminal device to a client of the terminal device, at least one message which comprises the at least one certificate request message at least encrypted or integrity-protected by the at least one second key; and
transmitting, by the client of the terminal device to a server, at least one first request message which comprises the at least one certificate request message at least encrypted or integrity-protected by the at least one second key, and comprises a Bootstrapping-Transaction Identifier (B-TID) and a Fully Qualified Domain Name (FQDN) of the server.

2. The method of claim 1, further comprising:
receiving, by the terminal device, at least one first response message from a server, and performing, by the terminal device, at least integrity verification or decryption on the at least one first response message based on the at least one second key, and
obtaining, by the terminal device, at least one digital certificate carried in the at least one first response message.

3. The method of claim 2, wherein the terminal device comprises a modem,
receiving, by the terminal device, the at least one first response message from the server, and performing, by the terminal device, at least integrity verification or decryption on the at least one first response message based on the at least one second key, and obtaining, by the terminal device, the at least one digital certificate carried in the at least one first response message comprises:
receiving, by the client, the at least one first response message from the server, and transmitting, by the client, the at least one first response message to the USIM through the modem;
performing, by the USIM, at least integrity verification or decryption on the at least one first response message based on the at least one second key; and
obtaining, by the USIM, the at least one digital certificate carried in the at least one first response message after the verification is passed, and storing, by the USIM, the at least one digital certificate in a security component.

4. The method of claim 1, wherein the terminal device comprises a modem,
generating, by the USIM of the terminal device, the at least one second key based on the at least one first key, and performing, by the USIM of the terminal device, at least encryption or integrity protection on the at least one certificate request message based on the at least one second key comprises:
triggering, by the client, the USIM through the modem, to generate the at least one second key based on the at least one first key;
generating, by the client, at least one first certificate request message, and transmitting, by the client, the at least one first certificate request message to the USIM through the modem;
generating, by the USIM, a public/private key pair, and adding, by the USIM, the public key in the public/private key pair to the at least one first certificate request message, and signing, by the USIM, the at least one first certificate request message with the private key in the public/private key pair, to obtain at least one second certificate request message;

performing, by the USIM, at least encryption or integrity protection on the at least one second certificate request message based on the at least one second key, and performing, by the USIM, the at least encryption or integrity protection including: adding, by the USIM, a first verification value to the at least one second certificate request message; and transmitting, by the USIM, the processed at least one second certificate request message to the client through the modem.

5. The method of claim 1, further comprising:
performing, by the terminal device, a Generic Bootstrapping Architecture (GBA) authentication process or an Authentication and Key Management for Applications (AKMA) authentication process.

6. A terminal device, comprising a memory, a processor, and a computer program stored on the memory and executable by the processor, the processor is configured to implement steps of the method of claim 1 when the processor executes the computer program.

7. The terminal device of claim 6, wherein the processor, when executing the computer program, is further configured to:
receive at least one first response message from a server, and perform at least integrity verification or decryption on the at least one first response message based on the at least one second key, and obtain at least one digital certificate carried in the at least one first response message.

8. A method for configuring a terminal device, comprising:
receiving, by a server, at least one first request message, which comprises at least one certificate request message at least encrypted or integrity-protected by at least one second key, and comprises a Bootstrapping-Transaction Identifier (B-TID) and a Fully Qualified Domain Name (FQDN) of the server, from the terminal device;
obtaining, by the server, the at least one second key from a network device, comprising: transmitting, by the server, at least one second request message to the network device, the at least one second request message being configured to request the at least one second key and comprising the B-TID and the FQDN; and receiving, by the server, at least one second response message transmitted by the network device, the at least one second response message comprising the at least one second key; and
performing, by the server, at least integrity verification or decryption on the at least one first request message based on the at least one second key, and wherein in a case that the server receives the at least one first request message, the method further comprises:
issuing, by the server, at least one digital certificate after authorization of the at least one first request message is passed; and
transmitting, by the server, at least one first response message to the terminal device, the at least one first response message comprising the at least one digital certificate.

9. The method of claim 8, wherein transmitting, by the server, the at least one first response message to the terminal device comprises:
constructing, by the server, the at least one first response message containing the at least one digital certificate, and performing, by the server, at least encryption or integrity protection on the at least one first response message based on the at least one second key, and performing, by the server, the at least encryption or integrity protection including: adding, by the server, a second verification value to the at least one first response message; and
transmitting, by the server, the processed at least one first response message to the terminal device.

10. The method of claim 8, wherein the at least one first request message comprises B-TID,
obtaining, by the server, the at least one second key from the network device comprises:
querying, by the server, whether there is at least one second key corresponding to the B-TID; and
obtaining, by the server, the at least one second key from the network device, in response to the querying result indicating that there is no second key corresponding to the B-TID.

11. A server, comprising a memory, a processor, and a computer program stored on the memory and executable by the processor, the processor is configured to implement steps of the method of claim 8 when the processor executes the computer program.

12. The server of claim 11, wherein in transmitting the at least one first response message to the terminal device, the processor, when executing the computer program, is configured to: construct the at least one first response message containing the at least one digital certificate, and performing, by the server, at least encryption or integrity protection on the at least one first response message based on the at least one second key, and adding, by the server, a second verification value to the at least one first response message; and transmit the processed at least one first response message to the terminal device.

* * * * *